(12) United States Patent
Baek

(10) Patent No.: US 12,373,137 B2
(45) Date of Patent: Jul. 29, 2025

(54) MEMORY CONTROLLER, MEMORY SYSTEM, AND OPERATING METHOD OF MEMORY SYSTEM

(71) Applicant: SK hynix Inc., Icheon-si (KR)

(72) Inventor: Seung Hwa Baek, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 40 days.

(21) Appl. No.: 18/396,041

(22) Filed: Dec. 26, 2023

(65) Prior Publication Data

US 2025/0044987 A1    Feb. 6, 2025

(30) Foreign Application Priority Data

Aug. 4, 2023   (KR) .................. 10-2023-0102215

(51) Int. Cl.
*G06F 3/06*        (2006.01)

(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0656; G06F 3/0679; G06F 3/061; G06F 3/0658; G06F 2212/1016
See application file for complete search history.

(56) References Cited

U.S. PATENT DOCUMENTS

| | | | |
|---|---|---|---|
| 10,095,433 B1 | 10/2018 | Gao | |
| 11,099,754 B1 * | 8/2021 | Mallick | ................... G06F 3/061 |
| 2005/0138667 A1 * | 6/2005 | Delpuch | ............ H04N 7/17309 |
| | | | 725/111 |
| 2007/0234323 A1 * | 10/2007 | Franaszek | ............. G06F 8/4442 |
| | | | 717/151 |
| 2012/0278583 A1 * | 11/2012 | Woo | ......................... G06F 9/52 |
| | | | 711/E12.001 |
| 2022/0391093 A1 * | 12/2022 | Kang | .................... G06F 3/0604 |
| 2023/0044866 A1 | 2/2023 | Benisty et al. | |
| 2023/0266917 A1 * | 8/2023 | Choe | .................... G06F 12/0879 |
| 2025/0053333 A1 * | 2/2025 | Kim | ....................... G06F 3/0604 |

* cited by examiner

*Primary Examiner* — Sean D Rossiter
(74) *Attorney, Agent, or Firm* — Weaver Austin Villeneuve & Sampson LLP

(57) ABSTRACT

A memory controller includes: an initiation queue for storing identification information corresponding to read data of which preparation for transfer to outside the memory controller has started, in response to read requests received from the outside; a completion queue for storing identification information corresponding to read data of which preparation for transfer to the outside is complete; and a data package generator for generating hint information, based on information stored in the initiation queue and the completion queue, generating a data packet including the hint information and first read data of which preparation for transfer is complete, and transferring the data packet to the outside. The hint information may include information on second read data to be transferred to the outside subsequently to the first read data.

20 Claims, 31 Drawing Sheets

FIG. 5

| | | | |
|---|---|---|---|
| | DATA IN PIU | | |
| 0<br>Transaction Type<br>(= xx10 0010b) | 1<br>Flags | 2<br>LUN | 3<br>Task Tag |
| 4<br>IID \| Reserved | 5<br>EXT_IID \| Reserved | 6<br>Reserved | 7<br>Reserved |
| 8<br>Total EHS Length<br>(00h) | 9<br>Reserved | 10 (MSB)<br>Data Segment Length | 11 (LSB) |
| 12 (MSB) | 13 | 14 | 15 (LSB) |
| | Data Buffer Offset | | |
| 16 (MSB) | 17 | 18 | 19 (LSB) |
| | Data Transfer Count | | |
| 20<br>Reserved \| HintControl | 21<br>HintEXT_IID \| HintIID | 22<br>HintLUN | 23<br>HintTaskTag |
| 24 | 25 | 26 | 27 |
| | Hint Data Buffer Offset | | |
| 28 | 29 | 30 | 31 |
| | Hint Data Count | | |
| | Header E2ECRC (omit if HD=0) | | |
| k<br>Data[0] | k+1<br>Data[1] | k+2<br>Data[2] | k+3<br>Data[3] |
| ⋮ | ⋮ | ⋮ | ⋮ |
| k+Length-4<br>Data[Length-4] | k+Length-3<br>Data[Length-3] | k+Length-2<br>Data[Length-2] | k+Length-1<br>Data[Length-1] |
| | Data E2ECRC (omit if HD=0) | | |

61: rows 0–11
62: rows 12–31 with 65 bracketing rows 20–31
64: data rows

FIG. 24

| | | | |
|---|---|---|---|
| | Ready To Transfer PIU | | |
| 0<br>Transaction Type<br>(= xx11 0001b) | 1<br>Flags | 2<br>LUN | 3<br>Task Tag |
| 4<br>IID \| Reserved | 5<br>EXT_IID \| Reserved | 6<br>Reserved | 7<br>Reserved |
| 8<br>Total EHS Length<br>(00h) | 9<br>Reserved | 10 (MSB) | 11 (LSB)<br>Data Segment Length (0000h) |
| 12 (MSB) | 13 | 14 | 15 (LSB) |
| | Data Buffer Offset | | |
| 16 (MSB) | 17 | 18 | 19 (LSB) |
| | Data Transfer Count | | |
| 20<br>Reserved \| HintControl | 21<br>HintEXT_IID \| HintIID | 22<br>HintLUN | 23<br>HintTaskTag |
| 24 | 25 | 26 | 27 |
| | Hint Data Buffer Offset | | |
| 28 | 29 | 30 | 31 |
| | Hint Data Count | | |
| | Header E2ECRC (omit if HD=0) | | |

Regions: 61 (bytes 0–11), 62 (bytes 12–31), 65 (bytes 20–31)

MEMORY CONTROLLER, MEMORY SYSTEM, AND OPERATING METHOD OF MEMORY SYSTEM

CROSS-REFERENCE TO RELATED APPLICATION

The present application claims priority under 35 U.S.C. § 119 (a) to Korean patent application number 10-2023-0102215 filed on Aug. 4, 2023, in the Korean Intellectual Property Office, the entire disclosure of which is incorporated by reference herein.

BACKGROUND

1. Technical Field

The present disclosure generally relates to an electronic device, and more particularly, to a memory controller, a memory system, and an operating method of a memory system.

2. Related Art

A semiconductor memory can be classified as a volatile memory device in which stored data disappears when the supply of power is interrupted, such as an SRAM or a DRAM, or a nonvolatile memory device in which stored data retains even when the power of supply is interrupted, such as a PRAM, an MRAM, an RRAM, or an FRAM.

A flash memory device is widely used as a large-capacity storage medium of computing systems. Recently, various techniques for supporting a high-speed operation of the flash memory device have been developed. In an example, a Universal Flash Storage (UFS) interface defined by the JEDEC standard may support an improved operation speed as compared with conventional flash memory-based storage devices.

SUMMARY

Embodiments provide a memory controller, a memory system, and an operating method of a memory system, which can more efficiently generate hint information on data to be provided next.

In accordance with an aspect of the present disclosure, there is provided a memory controller including: an initiation queue configured to store identification information corresponding to read data of which preparation for transfer to outside the memory controller has started, in response to read requests received from the outside; a completion queue configured to store identification information corresponding to read data of which preparation for transfer to the outside is complete; and a data package generator configured to generate hint information based on information stored in the initiation queue and the completion queue, generate a data packet including the hint information and first read data of which preparation for transfer to the outside is complete, and transfer the data packet to the outside, wherein the hint information includes information on second read data to be transferred to the outside subsequent to the first read data.

In accordance with another aspect of the present disclosure, there is provided a memory system including: a memory device; a memory controller configured to provide a data packet including read data to outside the memory system in response to read requests received from the outside; a buffer memory configured to store the read data read from the memory device; and a queue group including one or more queues configured to store information representing a transfer state of the read data from the memory device to the buffer memory, wherein the data packet includes: a basic header including information on first read data; a hint header including information on second read data to be provided subsequent to the first read data; and a data segment including the first read data.

In accordance with still another aspect of the present disclosure, there is provided a method of operating a memory system, the method including: starting storage of first read data and second read data in a buffer memory from a memory device in response to read requests received from outside the memory system; storing, in an initiation queue, identification information corresponding to the first read data and the second read data; generating hint information including information on the second read data, based on identification information stored in the initiation queue and a completion queue, when storage of the first read data in the buffer memory is complete; and outputting a data packet including the first read data and the hint information, wherein the completion queue is configured to store identification information corresponding to read data of which storage in the buffer memory is complete.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 is a diagram illustrating a structure of a data in Protocol Information Unit (PIU) as an example of a data packet generated in the memory system in accordance with an embodiment of the present disclosure.

FIG. 24 is a diagram illustrating a Ready To Transfer (RTT) Protocol Information Unit (PIU) as another example of the data packet generated in the memory system in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
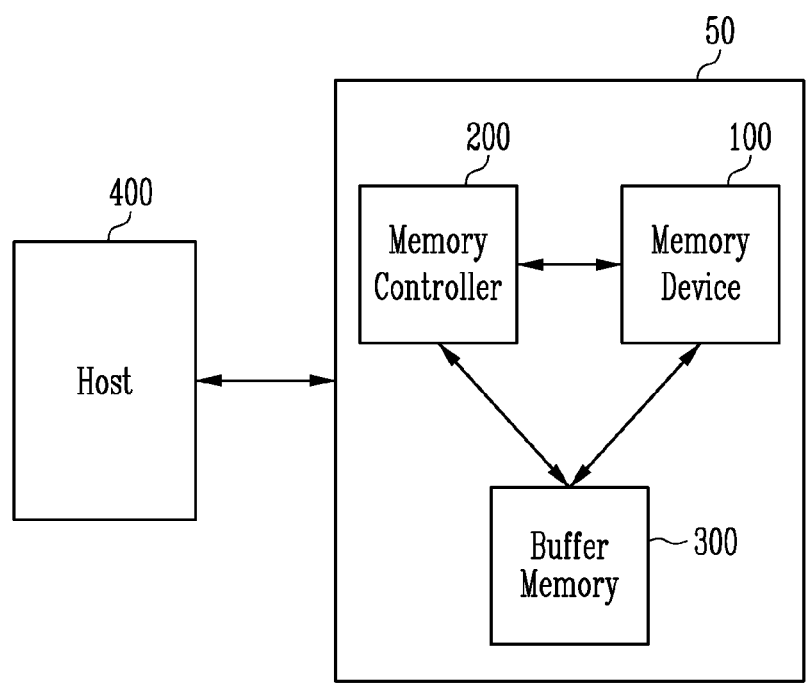
FIG. 1 is a diagram illustrating a memory system in accordance with an embodiment of the present disclosure.

FIG. 1 is a diagram illustrating a memory system in accordance with an embodiment of the present disclosure.

Referring to FIG. 1, the memory system 50 may include a memory device 100, a memory controller 200, and a buffer memory 300.

The memory system 50 may be a device for storing data under the control of a host 400, such as a mobile phone, a smart phone, an MP3 player, a laptop computer, a desktop computer, a game console, a TV, a tablet PC or an in-vehicle infotainment system. Alternatively, the memory system 50 may be a device for storing data under the control of the host 400 for storing high-capacity data in one place, such as a server or a data center. The memory system 50 may be manufactured as any one of various types of memory systems according to a host interface that is a communication scheme with the host 400. Also, the memory system 50 may be manufactured as any one of various kinds of package types.

The memory device 100 may store data. The memory device 100 may operate under the control of the memory controller 200. The memory device 100 may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The memory cell array may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

In an embodiment, the memory device 100 may be, for example, a volatile memory device or a nonvolatile memory device. In this specification, for convenience of description, a case where the memory device 100 is a NAND flash memory is assumed and described.

The memory device 100 may receive a command and an address from the memory controller 200, and access an area selected by the address in the memory cell array. The memory device 100 may perform an operation instructed by the command on the area selected by the address. For example, the memory device 100 may perform a write operation (program operation), a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory controller 200 may control overall operations of the memory system 50.

When power is applied to the memory system 50, the memory controller 200 may execute firmware (FW). When the memory device 100 is a flash memory device, the memory controller 200 may execute FW such as a flash translation layer (FTL) for controlling communication between the host 400 and the memory device 100.

In an embodiment, the memory controller 200 may receive data and a Logical Address (LA), which are input from the host 400, and translate the LA into a Physical Address (PA) representing addresses of memory cells included in the memory device 100, at which data is to be stored.

The memory controller 200 may control the memory device 100 to perform a program operation, a read operation, an erase operation, or the like in response to a request from the host 400. In the program operation, the memory controller 200 may provide a program command, a PA, and data to the memory device 100. In the read operation, the memory controller 200 may provide a read command and a PA to the memory device 100. In the erase operation, the memory controller 200 may provide an erase command and a PA to the memory device 100.

In an embodiment, the memory controller 200 may autonomously generate a command, an address, and data regardless of any request from the host 400, and transmit the command, the address, and the data to the memory device 100. For example, the memory controller 200 may provide the memory device 100 with a command, an address, and data, which are used to perform read and program operations for wear leveling, read reclaim, garbage collection, or the like.

In an embodiment, the memory controller 200 may control at least two memory devices 100. The memory controller 200 may control the memory devices 100 according to an interleaving scheme so as to improve operational performance. The interleaving scheme may be a scheme for controlling operations on at least two memory devices 100 to overlap with each other. Also, the interleaving scheme may be a scheme for controlling operations of a plurality of groups divided in one memory device 100 to overlap with each other. The group may include at least one memory die unit or at least one memory plane unit.

The host 400 may communicate with the memory system 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In this specification, for convenience of description, a case where the memory system 50 and the host 400 perform data communication according to a UFS communication interface is described, but embodiments of the present disclosure are not limited to data communication performed according to the UFS communication interface. Specifically, the memory system 50 and the host 400 may perform data communication, using a data packet defined as a Protocol Information Unit (hereinafter, referred to as a PIU). The PIU may be a data packet generated according to a predetermined protocol. For example, the PIU generated according to the UFS communication interface may be defined as a UFS Protocol Information Unit (UPIU). Therefore, in this specification, the PIU is a form of the data packet transmitted/received between the memory system 50 and the host 400, and hence the command and the PIU may substantially have the same meaning.

The PIU may be used for the host 400 or the memory system 50 to request, instruct, or respond to performing of any operation. In an embodiment, various PIUs may be defined according to use and purpose. For example, data packets including command, response, data out, query request, data in, ready to transfer, and the like may be transmitted/received between the memory system 50 and the host 400. In an embodiment, these data packets may be transmitted in the form of the PIU described above. The smallest size of the PIU may be 32 bytes, and a maximum size of the PIU may be 65,600 bytes. The format of the PIU may have different sizes according to a type thereof.

In an embodiment, a read request of the host 400 may be provided in the form of a command PIU to the memory system 50. Also, in an embodiment, information which the memory controller 200 provides to the host 400 in response to the read request may also be provided in the form of a data packet. For example, the memory controller 200 may provide the host 400 with a data-in PIU and/or a response PIU in response to the read request. The data-in PIU is a data packet for providing the host 400 with read data corresponding to the read request, and the read data may be included in the data-in PIU.

The host 400 may provide the memory system 50 with a read request for requesting reading data from the memory device 100, and receive read data corresponding to the read request from the memory system 50. The host 400 may receive, in advance, hint information on read data to be subsequently provided from the memory system 50. In an embodiment, the hint information may be included in a data-in PIU to be provided to the host 400. The host 400 may easily control the read data received subsequently, based on the hint information. In an embodiment, a size of the hint information provided to the host 400 may be a predetermined size or less. That is, the hint information exceeding the predetermined size may not be provided to the host 400. In an embodiment, an allowable size range of the hint information may be set by a request of the host 400 by considering the size of a memory area in the host 400.

In an embodiment, the memory controller 200 may include one or more queues including information representing a ready state of read data corresponding to a read request from the host 400 in response to the read request. For example, the information representing the ready state of the read data may be information representing a transfer state of the read data from the memory device 100 to the buffer memory 300. The memory controller 200 may generate hint information, based on information stored in the one or more queues. In an embodiment, the memory controller 200 may predict which read data is read data to be provided to the host 400 subsequently to a data packet being currently generated, based on the information stored in the one or more queues, and allow information on the read data to be subsequently provided according to this prediction to be included in the data packet being currently generated.

The buffer memory 300 may temporarily store data transmitted between the host 400 and the memory device 100. For example, the buffer memory 300 may temporarily store data transmitted from the host 400 to the memory device 100 for the purpose of a write operation of storing data in the memory device 100. Alternatively, the buffer memory 300 may temporarily store data transmitted from the memory device 100 to the host 400 for the purpose of a read operation of reading data from the memory device 100. Besides, the buffer memory 300 may temporarily store map data or temporarily store data for a background operation. However, the present disclosure is not limited thereto, and the buffer memory 300 may be used as a buffer for temporarily storing data when various operations are performed.

In an embodiment, when the memory system 50 receives a read request from the host 400, read data corresponding to the read request may be read from the memory device 100 to be stored in the buffer memory 300 under the control of the memory controller 200. In an embodiment, information on a storage progress state of read data with respect to the buffer memory 300 may be stored in the one or more queues in the memory controller 200. For example, identification information on the read data of which storage in the buffer memory 300 is started may be stored in any one queue among the one or more queues in the memory controller 200. In addition, identification information on read data of which storage in the buffer memory 300 is complete may be stored in any one queue among the one or more queues in the memory controller 200.

Figure 2:
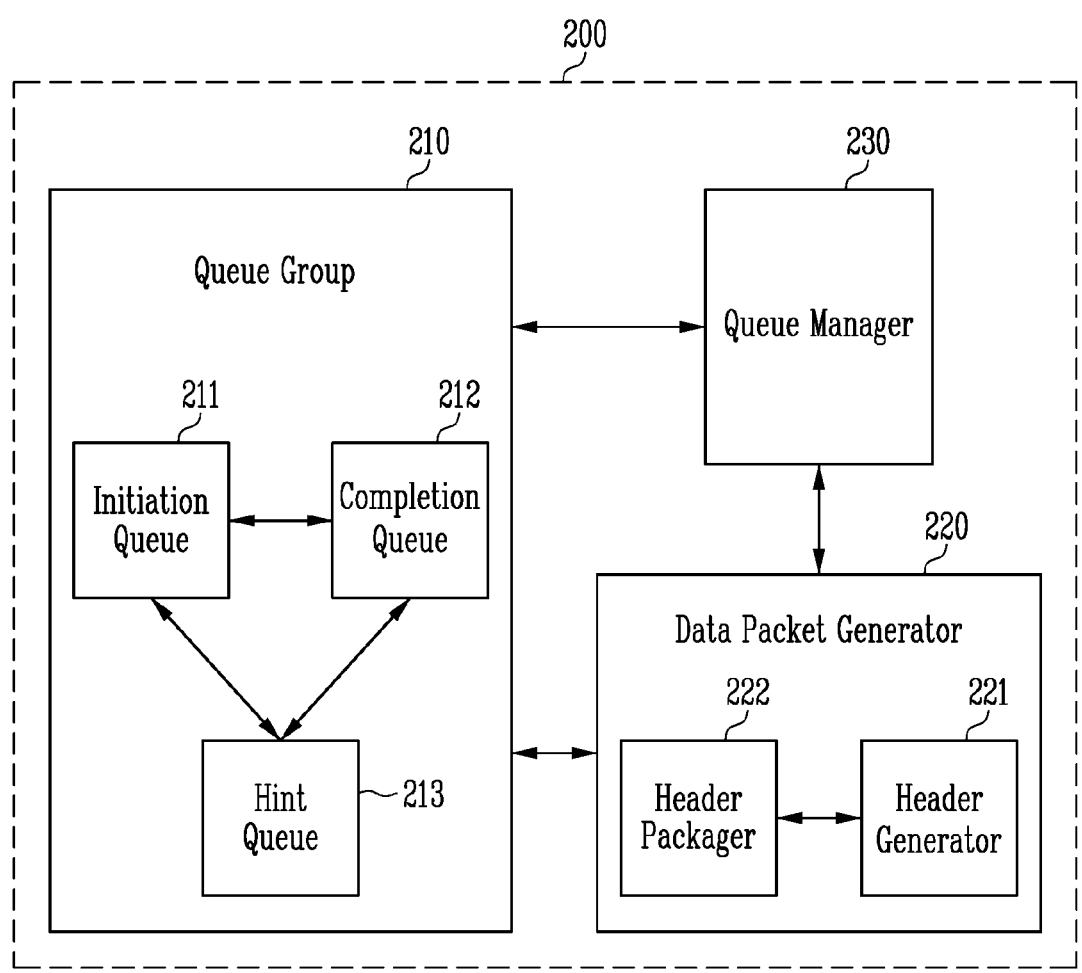
FIG. 2 is a diagram illustrating an example of a memory controller shown in FIG. 1.

FIG. 2 is a diagram illustrating an example of the memory controller shown in FIG. 1.

Referring to FIGS. 1 and 2, the memory controller 200 may include a queue group 210, a queue manager 230, and a data packet generator 220.

The queue group 210 may include one or more queues. In an embodiment, information representing a ready state of read data may be stored in each queue. In an embodiment, information representing a storage progress state of read data with respect to the buffer memory 300 may be stored in each queue. For example, the queue group 210 may include an initiation queue 211, a completion queue 212, and a hint queue 213. In FIG. 2, it is illustrated that the queue group 210 is located in the memory controller 200. However, in another embodiment, the queue group 210 may occupy a memory area outside of the memory controller 200.

In an embodiment, identification information corresponding to read data of which preparation to be provided to the host 400 is started may be stored in the initiation queue 211. In an embodiment, the identification information corresponding to the read data of which preparation to be provided is started may be information representing which read data is the read data of which preparation to be provided is started. For example, identification information corresponding to read data of which storage in the buffer memory 300 is started may be stored in the initiation queue 211.

In an embodiment, identification information corresponding to read data of which preparation to be provided to the host 400 is complete may be stored in the completion queue 212. In an embodiment, the identification information corresponding to the read data of which preparation to be provided is complete may be information representing which read data is the read data of which preparation to be provided is complete. For example, identification information corresponding to read data of which storage in the buffer memory 300 is complete may be stored in the completion queue 212.

In an embodiment, identification information corresponding to read data on which hint information is generated by the data packet generator 220 may be stored in the hint queue 213. In embodiment, the identification information corresponding to the read data on which the hint information is generated may be simply information representing which read data is the read data on which the hint information is generated, or be hint information itself on the corresponding read data.

The queue manager 230 may control the queue group 210 such that identification information is stored in or deleted from the queues 211, 212, and 213. In an embodiment, when preparation of read data is started, e.g., when storage of read data in the buffer memory 300 is started, the queue manager 230 may control the initiation queue 211 such that identification information corresponding to the corresponding read data is stored in the initiation queue 211.

In an embodiment, when preparation of read data is complete, e.g., when storage of read data in the buffer memory 300 is complete, the queue manager 230 may control the completion queue 212 such that identification information corresponding to the corresponding read data is stored in the completion queue 212. In addition, when the identification information corresponding to the corresponding read data is stored in the completion queue 212 as the preparation of the read data is complete, the queue manager 230 may control the initiation queue 211 such that the identification information corresponding to the corresponding read data is deleted from the initiation queue 211.

In an embodiment, when hint information on read data to be subsequently provided is generated, the queue manager 230 may control the hint queue 213 such that identification information corresponding to the corresponding read data is stored in the hint queue 213. In addition, when the identification information corresponding to the corresponding read data is stored in the hint queue 213 as the hint information on the read data to be subsequently provided is generated, the queue manager 230 may control the initiation queue 211 or the completion queue 212 such that the identification information corresponding to the corresponding read data is deleted from the initiation queue 211 or the completion queue 212.

In an embodiment, when a data packet including read data is output to the host 400, the queue manager 230 may control the initiation queue 211 or the completion queue 212 such that identification information corresponding to the corresponding read data is deleted from the completion queue 212 or the hint queue 213.

The data packet generator 220 may generate a data packet, based on the identification information stored in the queues 211, 212, and 213 included in the queue group 210. In an embodiment, the data packet may be a data-in PIU for providing read data to the host 400. The data-in PIU may include a basic header including first read data and information on the first read data, and a hint header including information on second read data to be provided to the host 400 subsequently to the first read data. In an embodiment, information on second read data, which is included in a hint header of a data packet through which first read data is transmitted, and information on second read data, which is included in a basic header of a data packet through which the second read data is subsequently transmitted, may be the same or at least partially overlap with each other.

The data packet generator 220 may include a header generator 221, and the header generator 221 may generate headers included in a data packet. In an embodiment, the header generator 221 may determine first read data to be included in a data packet, based on the identification information stored in the queues 211, 212, and 213, and generate a basic header for the determined first read data. The first read data may be read data of which preparation to be provided to the host 400 is complete. More specifically, the first read data may be read data of which storage in the buffer memory 300 is complete.

For example, the header generator 221 may preferentially determine first read data among read data corresponding to identification information stored in the hint queue 213, among read data of which preparation to be provided to the host 400 is complete. When the read data corresponding to the identification information stored in the hint queue 213 does not exist among the read data of which preparation to be provided to the host 400 is complete, the header generator 221 may determine the first read data among the read data corresponding to the identification information stored in the completion queue 212. That is, the header generator 221 may preferentially determine, as the first read data, read data on which hint information has been already generated among the read data of which preparation to be provided to the host 400 is complete. As described above, in an embodiment, with respect to any one read data, information provided to a hint header of a preceding data packet and information provided to a basic header of a subsequent data packet may at least partially overlap with each other. Therefore, when read data on which hint information has been already generated and provided is determined as the first read data, a time required to generate the basic header can be shortened, and accordingly, a data packet can be more rapidly generated and provided to the host 400.

In an embodiment, the header generator 221 may determine second read data to be provided to the host 400 subsequently to the first read data, based on the identification information stored in the queues 211, 212, and 213, and generate a hint header for the determined second read data. In an embodiment, the hint header for the second read data may be generated for storing in the hint queue 213. Identification information stored in the hint queue 213 may be hint information itself on the second read data. Alternatively, in another embodiment, the hint header for the second read data may be generated for storing in a separate storage space distinguished from the hint queue 213. The identification information stored in the hint queue 213 may be information representing which read data is the second read data on which hint information is generated.

For example, the header generator 221 may preferentially determine the second read data among read data corresponding to the identification information stored in the completion queue 212. More specifically, the header generator 221 may determine the second read data among read data which are not the first read data, among the read data corresponding to the identification information stored in the completion queue 212. When the read data which are not the first read data do not exist among the read data corresponding to the identification information stored in the completion queue 212, the header generator 221 may determine the second read data among read data corresponding to the identification information stored in the initiation queue 211. That is, it is highly likely that read data on which identification information is stored in the completion queue 212 will be provided to the host 400 subsequently to the first read data, and therefore, the read data may be preferentially determined as the second read data. In addition, it is highly likely that read data of which identification information is stored in the initiation queue 211 will be provided to the host 400 subsequently to the first read data as compared with read data of which storage in the buffer memory 300 is not started, and therefore, the read data on which identification information is stored in the initiation queue may be secondarily determined as the second read data.

In an embodiment, the header generator 221 may generate a header in a predetermined period. That is, the header generator 221 may determine the first read data and the second read data, based on identification information stored in the queue group 210 at a time according to the predetermined period. In an implementation example, the header generator 221 may further include a timer for counting a predetermined period.

The data packet generator 220 may include a header packager 222. The header packager 222 may package the generated headers, thereby generating a data packet. In an embodiment, the header packager 222 may package the basic header for the first read data and the hint header for the second read data. In an embodiment, the header packager 222 may further package first read data stored in the buffer memory 300. That is, the header packager 222 may generate a data packet including the basic header for the first read data, the hint header for the second read data, and the first read data.

Figure 3:
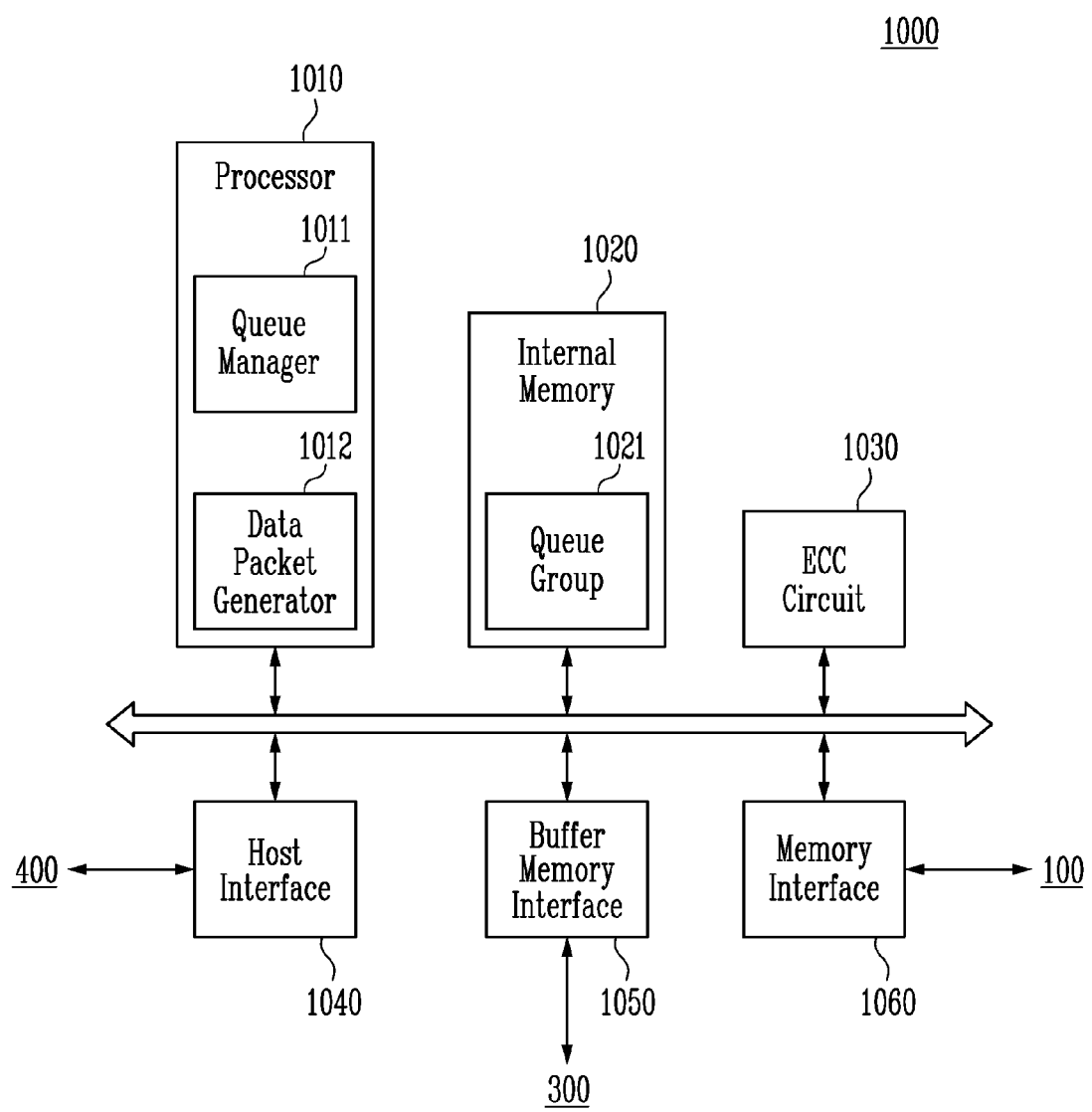
FIG. 3 is a diagram illustrating another example of the memory controller shown in FIG. 1.

FIG. 3 is a diagram illustrating another example of the memory controller shown in FIG. 1.

Referring to FIG. 3, a memory controller 1000 may include a processor 1010, an internal memory 1020, an error correction code (ECC) circuit 1030, a host interface 1040, a buffer memory interface 1050, and a memory interface 1060.

The processor 1010 may perform various calculations for controlling the memory device 100 or generate various commands. When the processor 1010 receives a request from the host 400, the processor 1010 may generate a command according to the received request, and transmit the generated command to a queue controller. The processor 1010 may receive a read request from the host 400, and generate a read command in response to the read request. The processor 1010 may include a queue manager 1011, and the queue manager 1011 may control a queue group 1021 in the internal memory 1020. For example, the queue manager 1011 may generate or delete identification information corresponding to read data in or from queues included in the queue group 1021. The processor 1010 may include a data packet generator 1012. The data packet generator 1012 may generate a data packet, based on identification information stored in the queues in the queue group 1021. In an embodiment, the data packet may be a data-in PIU for providing read data to the host 400 in response to the read request of the host 400.

The internal memory 1020 may store various information necessary for an operation of the memory controller 1000. For example, the internal memory 1020 may include logical and physical address map tables. The internal memory 1020 may be configured with at least one of a random access memory (RAM), a dynamic RAM (DRAM), a static RAM (SRAM), and a tightly coupled memory (TCM). The internal memory 1020 may include the queue group 1021, and the queue group 1021 may include one or more queues. The queues may store information representing a ready state of read data. For example, information representing a transfer state of read data from the memory device 100 to the buffer memory 300 may be stored in the queues. In an embodiment, the queue group 1021 may include an initiation queue for storing identification information corresponding to read data of which preparation to be provided to the host 400 is started, a completion queue for storing identification information corresponding to read data of which preparation to be provided to the host 400 is complete, and a hint queue for storing identification information corresponding to read data on which hint information is generated. In FIG. 3, it is illustrated that the queue group 1021 is included in the internal memory 1020. However, in another embodiment, the queue group 1021 may occupy a memory area outside of the memory controller 1000. For example, a partial area of the buffer area 300 may be allocated to the queue group.

The ECC circuit 1030 is configured to detect and correct an error of data received from the memory device 100 by using an error correction code (ECC). The processor 1010 may adjust a read voltage according to an error detection result of the ECC circuit 1030, and control the memory device 100 to perform re-reading (read retry). In an exemplary embodiment, an error correction block may be provided as a component of the memory controller 1000.

The host interface 1040 may exchange requests, addresses, data, and the like between the memory controller 1000 and the host 400. For example, the host interface 1040 may receive commands, addresses, data, and the like from the host 400, and output, to the host 400, data read from the memory device 100, a response to a command, and the like. The host interface 1040 may communicate with the host 400, using a protocol, such as a Universal Serial bus (USB), a Serial AT Attachment (SATA), a Serial Attached SCSI (SAS), a High Speed InterChip (HSIC), a Small Computer System Interface (SCSI), a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), a Load Reduced DIMM (LRDIMM), an Enhanced Small Disk Interface (ESDI), or Integrated Drive Electronics IDE. For example, the host interface 1040 may receive a read request and an address corresponding to the read request from the host 400. Also, the host interface 1040 may provide the host 400 with a data packet generated by the data packet generator 1012. The data packet provided to the host 400 in response to the read request may include a basic header including read data and information on the read data and a hint header including information on read data to be subsequently provided.

The buffer memory interface 1050 may transfer data between the processor 1010 and a buffer memory. The buffer memory may be used as a working memory or a cache memory of the memory controller 1000, and store data used in the memory system 50. The buffer memory may be used as a read buffer, a write buffer, a mapping buffer, or the like by the processor 1010. In some embodiments, the buffer memory may include a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR), or a Rambus Dynamic Access Memory (RDRAM). The buffer memory interface 1050 may store, in the buffer memory 300, read data read from the memory device 100 under the control of the processor 1010. In an embodiment, the buffer memory interface 1050 may provide the processor 1010 with information on a storage progress state of read data with respect to the buffer memory 300, and the queue manager 1011 may manage the queue group 1021, based on the information on the storage progress state of the read data with respect to the buffer memory 300. When the buffer memory is included in the memory controller 1000, the buffer memory interface 1050 may be omitted.

The memory interface 1060 may exchange commands, addresses, data, and the like between the memory controller 1000 and the memory device 100. For example, the memory interface 1060 may transmit commands, addresses, data, and the like to the memory device 100 through a channel, and receive data and the like from the memory device 100. In an embodiment, the memory interface 1060 may provide the memory device 100 with a read command generated by the processor 1010, and receive read data from the memory device 100.

Figure 4:
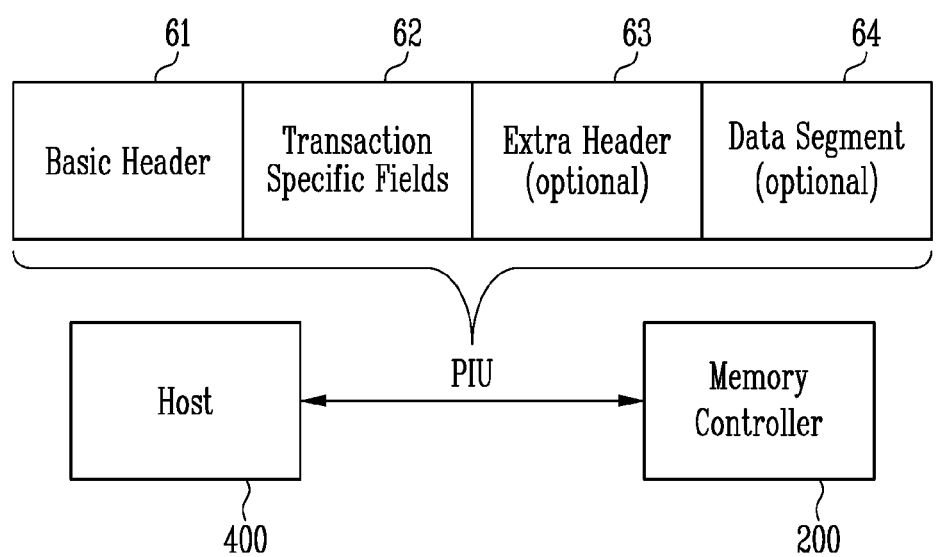
FIG. 4 is a diagram illustrating a data communication unit between a host and the memory controller.

FIG. 4 is a diagram illustrating a data communication unit between the host and the memory controller.

Referring to FIGS. 1 and 4, the host 400 and the memory controller 200 may communicate with each other, using data packets called Protocol Information Units (hereinafter, referred to as PIUs). In terms of interfacing between the host 400 and the memory system 50, any one device may transmit a PIU to another device. A device generating a PIU may be referred to as an initiator device, and a device receiving the generated PIU may be referred to as a target device. That is, the PIU is not a data packet which any one of the host 400 and the memory system 50 unilaterally transmit to the other device but may be a data packet transmitted between the two devices.

The PIU may include a query request PIU, a command PIU, a response PIU, a data-out PIU, a data-in PIU, and a ready to transfer PIU according to an operation which the host 400 or the memory controller 200 is to perform.

The query request PIU may provide the memory system 50 with a device descriptor providing several parameters of the memory system 50.

The command PIU may be a protocol information unit transmitted when the host 400 transfers a command to the memory system 50.

The response PIU may be a protocol information unit transmitted when the memory system 50 provides a response to a command provided by the host 400.

The data-out PIU may be a protocol information unit transmitted when the host 400 provides data to the memory system 50.

The data-in PIU may be a protocol information unit transmitted when the memory system 50 provides data to the host 400.

The ready to transfer PIU may be a protocol information unit transmitted when the memory system 50 informs that the memory system 50 has been ready to receive a data-out PIU from the host 400. The ready to transfer PIU may be transmitted when the memory system 50 has a sufficient buffer space in which data provided by the host 400 is to be stored.

The smallest size of the PIU may be 32 bytes, and a maximum size of the PIU may be 65,600 bytes. The format of the PIU may have different sizes according to a type thereof.

In an embodiment, the PIU may include a basic header 61, a transaction specific field 62, an extra header 63, and a data segment 64.

The basic header 61 may have a size of 12 bytes. The basic header 61 may be commonly included in all PIUs. The basic header 61 may include basic setting information related to the PIU.

The transaction specific field 62 may be included from a byte address 12 of the PIU to a byte address 31. The transaction specific field 62 may include a dedicated transaction code according to the type of the PIU.

The extra header 63 may be defined when a total extra header length (Total EHS Length) of the basic header 61 has a value which is not 0. The extra header 63 may start from a byte address 32 of the PIU. The extra header 63 may be an area capable of additionally storing data when sufficient information is not included in the basic header 61.

The data segment 64 may be included in the data-out PIU or the data-in PIU.

In an embodiment, the extra header 63 and the data segment 64 are not included in all PIUs, but may be included only in a specific PIU.

FIG. 5 is a diagram illustrating a structure of a data in Protocol Information Unit (PIU) as an example of a data packet generated in the memory system in accordance with an embodiment of the present disclosure.

Referring to FIGS. 1 and 5, the memory controller 200 may receive a read request in the form of a command PIU, and provide the host 400 with a data-in PIU generated in response to the read request.

The data-in PIU may include a basic header 61, a transaction specific field 62, and a data segment 64.

The basic header 61 may include information on read data, included in the data segment 64. The basic header 61 of the data-in PIU may include a transaction type, flags, a logical unit number (LUN), a task tag, an initiator ID and an extended initiator ID, a total extra header length (total EHS length), a data segment length, and the like.

The transaction type may be a field having a unique value according to a type of the PIU. An example of the transaction type according to the type of the PIU is shown in the following Table 1.

TABLE 1

| When initiation device provides to target device | Transaction type | When target device provides to initiation device | Transaction type |
| --- | --- | --- | --- |
| Command PIU | 00 0001b | Response PIU | 10 0001b |
| Data-out PIU | 00 0010b | Data-in PIU | 10 0010b |
| X | X | Ready to transfer PIU | 11 001b |

In an embodiment, since the PIU shown in FIG. 5 is the data-in PIU, the transaction type may be expressed as 10 0010b. The flags may be fields having different values according to the transaction type. The logical unit number (LUN) may be a field indicating a number of a logical unit on which an operation is to be performed among a plurality of logical units included in an object on which the operation is to be performed. For example, each of the host 400 and the memory system 50, which are described with reference to FIG. 1, may include a plurality of logical units, and the logical unit number (LUN) of the basic header 61 included in the PIU may represent a specific logical unit among the plurality of logical units.

The task tag may be a field having different values according to the transaction type.

The initiator ID (IID) and the extended initiator ID (EXT_IID) may be fields identifying who is an initiator requesting an operation. Therefore, the initiator ID may have different values depending on whether the host 400 generates the PIU or the memory system 50 generates the PIU.

The total extra header length (Total EHS Length) may be a field representing a size of an extra header in a 32-bit unit. The total extra header length (Total EHS Length) may be used when the PIU includes the extra header. The length of the extra header may be a 4-byte unit. The maximum size of the extra header may be, for example, 1024 bytes. When the extra header is not used, the total extra header length (Total EHS Length) may have a value of 0. In an embodiment, since the extra header is not used in the data-in PIU, the total extra header length (Total EHS Length) may have the value of 0.

The data segment length may be a field representing a length of a data segment of the PIU. When the PIU does not include the data segment, the data segment length may have a value of 0. In an embodiment, since the data-in PIU includes read data in the data segment 64, the data segment length may include a value which is not 0.

The transaction specific field 62 may be a field defined according to an operation performed by the PIU. The transaction specific field 62 may include a hint header 65 including a data buffer offset, a data transfer count, and hint information.

The data buffer offset may include an offset of a PIU data payload in the entire data transfer area. A sum of the data buffer offset and the data segment length may not exceed an expected data transfer length with which a read command PIU is received. By using the data buffer offset, the memory controller 200 may non-sequentially provide read data to the host 400.

The data transfer count may represent a number of bytes which a target device disposes in the data segment of the PIU to be re-transferred to an initiator device. A data transfer count value may be a number of valid bytes included in a data segment of a corresponding data-in PIU. The maximum number of bytes transferred in one data-in PIU may be 65,535 bytes. In an embodiment, the data transfer count and the above-described data segment length may include the same value.

The hint header 65 included in the transaction specific field 62 may include a plurality of fields including hint information. For example, the hint header 65 may include a hint initiator ID (HintIID, HintEXT_IID), a hint logical unit number (HintLUN), a hint task tag (HintTaskTag), a hint data buffer offset, and a hint data count.

A hint control field (HintControl) may be a field representing validity of various fields included in the hint header. In an embodiment, when the hint control field (HintControl) has a value of 0, this may mean that fields included in the hint header are not valid, and accordingly, the host 400 may ignore the fields included in the hint header. In addition, when the hint control field (HintControl) has a value of 1, this may mean the fields included in the hint header are valid.

The hint initiator ID (HintIID, HintEXT_IID) may be a field representing an initiator ID of a data-in PIU to be substantially transferred. Therefore, a value of the hint initiator ID (HintIID, HintEXT_IID) may be different from a value of an initiator ID (IID, EXT_IIID) of a current data-in PIU.

The hint logical unit number (HintLUN) may be a field representing a LUN of the data-in PIU to be substantially transferred. Therefore, a value of the hint logical unit number (HintLUN) may be different from a value of an LUN of the current data-in PIU.

The hint task tag (HintTaskTag) may be a field representing a task tag of the data-in PIU to be substantially transferred. Therefore, a value of the hint task tag (HintTaskTag) may be different from a value of a task tag of the current data-in PIU.

The hint data buffer offset may be a field representing a data buffer offset of the data-in PIU to be substantially transferred. Therefore, a value of the hint data buffer offset may be different from a value of a data buffer offset of the current data-in PIU.

The hint data count may be a field representing a size of data expected for the target device to transfer to the initiator device. In an embodiment, a value of the hint data count may be expressed as a value in a 4-KB unit. For example, when the value of the hint data count is 0, the hint data count may represent 4 KB. When the value of the hint data count is 1, the hint data count may represent 8 KB.

That is, the fields included in the hint header may at least partially overlap with information of the data-in PIU to be subsequently provided. For example, at least some of fields included in a hint header of the current data-in PIU may be identical to fields included a basic header and fields included in a transaction specific field of the data-in PIU to be subsequently transferred. In an embodiment, when the memory controller 200 generates a data-in PIU, the memory controller 200 may generate a hint header by expecting what is read data included in a subsequent data-in PIU to be provided subsequently to a current data-in PIU, to allow a hint header to be included in the current data-in PIU. In addition, the hint header generated to be included in the current data-in PIU may be used when a basic header and a transaction specific field of the subsequent data-in PIU are generated.

The data segment 64 may be an area including a data payload, and the maximum number of bytes transferred in one data-in PIU may be 65,535 bytes. Read data read from the memory device 100 may be included in the data segment 64. More specifically, read data read from the memory device 100 to be completely stored in the buffer memory 300 may be included in the data segment 64.

FIGS. 6 to 23 are diagrams illustrating a process of generating a data packet in the memory system in accordance with an embodiment of the present disclosure.

Referring to FIGS. 1, 2, and 6 to 23, the memory controller 200 may control the memory device 100 to read read data from the memory device 100 in response to a read request received from the host 400, and accordingly, the read data stored in the memory device 100 may be transferred to the buffer memory 300.

Figure 6:
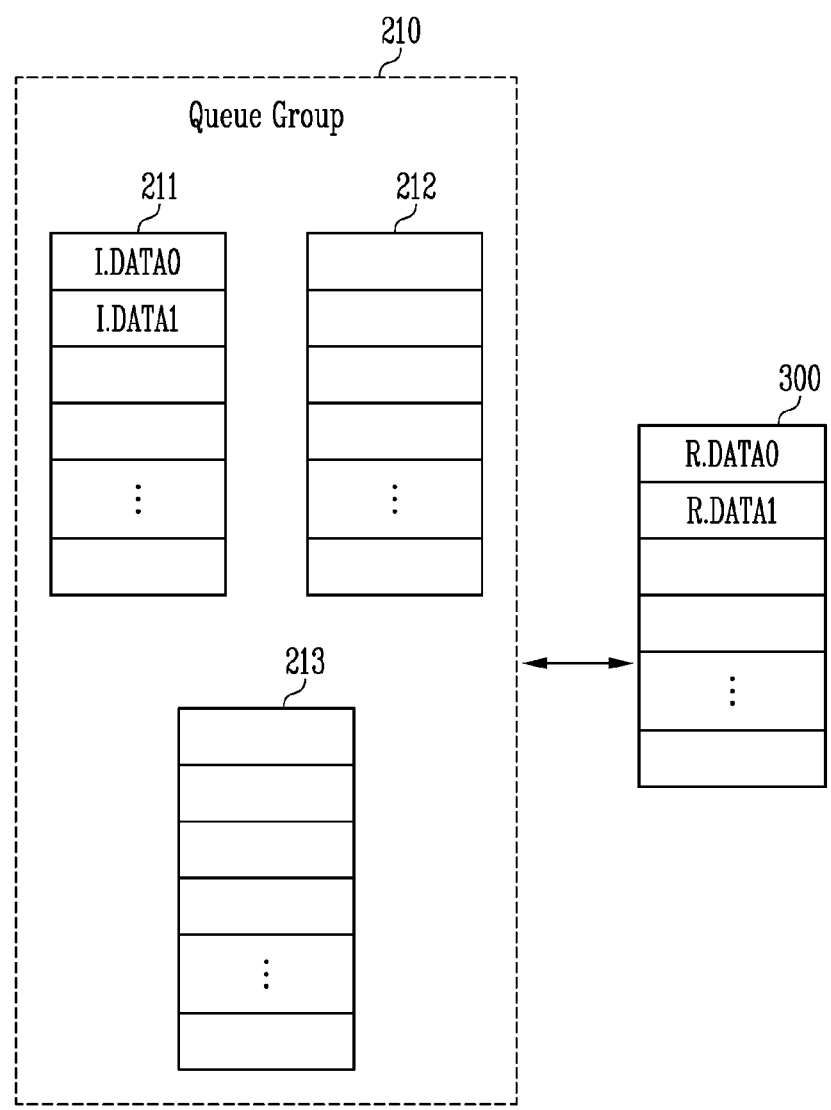
FIGS. 6 to 23 are diagrams illustrating a process of generating a data packet in the memory system in accordance with an embodiment of the present disclosure.

Referring to FIG. 6, storage of read data 0 (R.DATA0) and read data 1 (R.DATA1) in the buffer memory 300 may be started, and accordingly, identification information I.DATA0 and I.DATA1 corresponding to the read data R.DATA0 and R.DATA1 may be stored in the initiation queue 211.

Figure 7:
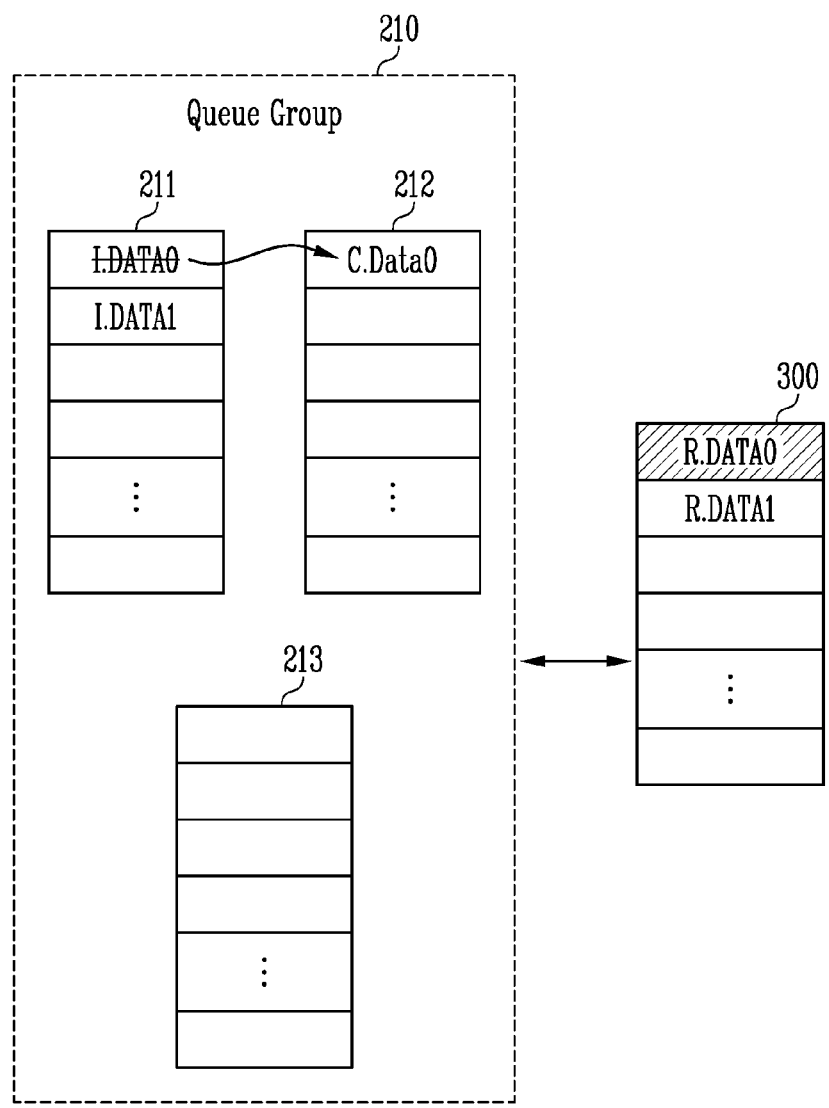

Referring to FIG. 7, storage of the read data R.DATA0 in the buffer memory 300 may be completed, and accordingly, identification information C.DATA0 corresponding to the read data R.DATA0 may be stored in the completion queue 212. When the identification information C.DATA0 corresponding to the read data R.DATA0 is stored in the completion queue 212, the identification information I.DATA0 corresponding to the read data R.DATA0, which is stored in the initiation queue 211, may be deleted.

Figure 8:
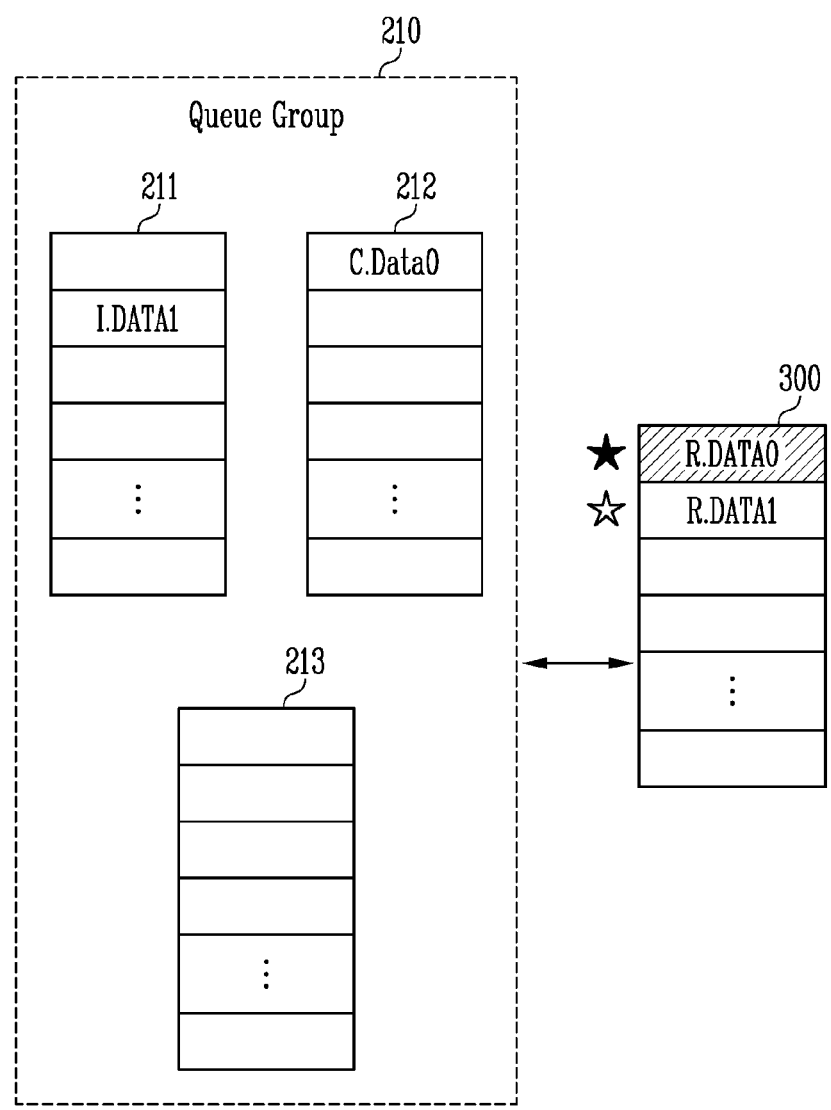

Referring to FIG. 8, in order to generate a data packet, first read data to be included in the data packet may be determined. First, the data packet generator 220 may select the first read data among read data corresponding to identification information stored in the hint queue 213. However, since there is no identification information currently stored in the hint queue 213, next, the data packet generator 220 may select the first read data among read data corresponding to the identification information stored in the completion queue 212. Therefore, the read data R.DATA0 may be determined as the first read data. Accordingly, the data packet generator 220 may generate a basic header including information on the read data R.DATA0 determined as the first read data.

Also, the data packet generator 220 may determine second read data to generate a hint header included in the data packet. The second read data may be read data expected to be provided to the host 400 subsequently to the first read data. First, the data packet generator 220 may select the second read data among read data which are not the first read data, among the read data corresponding to the identification information stored in the completion queue 212. However, since there is no read data which is not the first read data among the read data corresponding to the identification information stored in the completion queue 212, next, the data packet generator 220 may select the second read data among read data corresponding to the identification information stored in the initiation queue 211. Therefore, the read data R.DATA1 may be determined as the second read data. Accordingly, the data packet generator 220 may generate a hint header including hint information on the read data R.DATA1 determined as the second read data.

Figure 9:
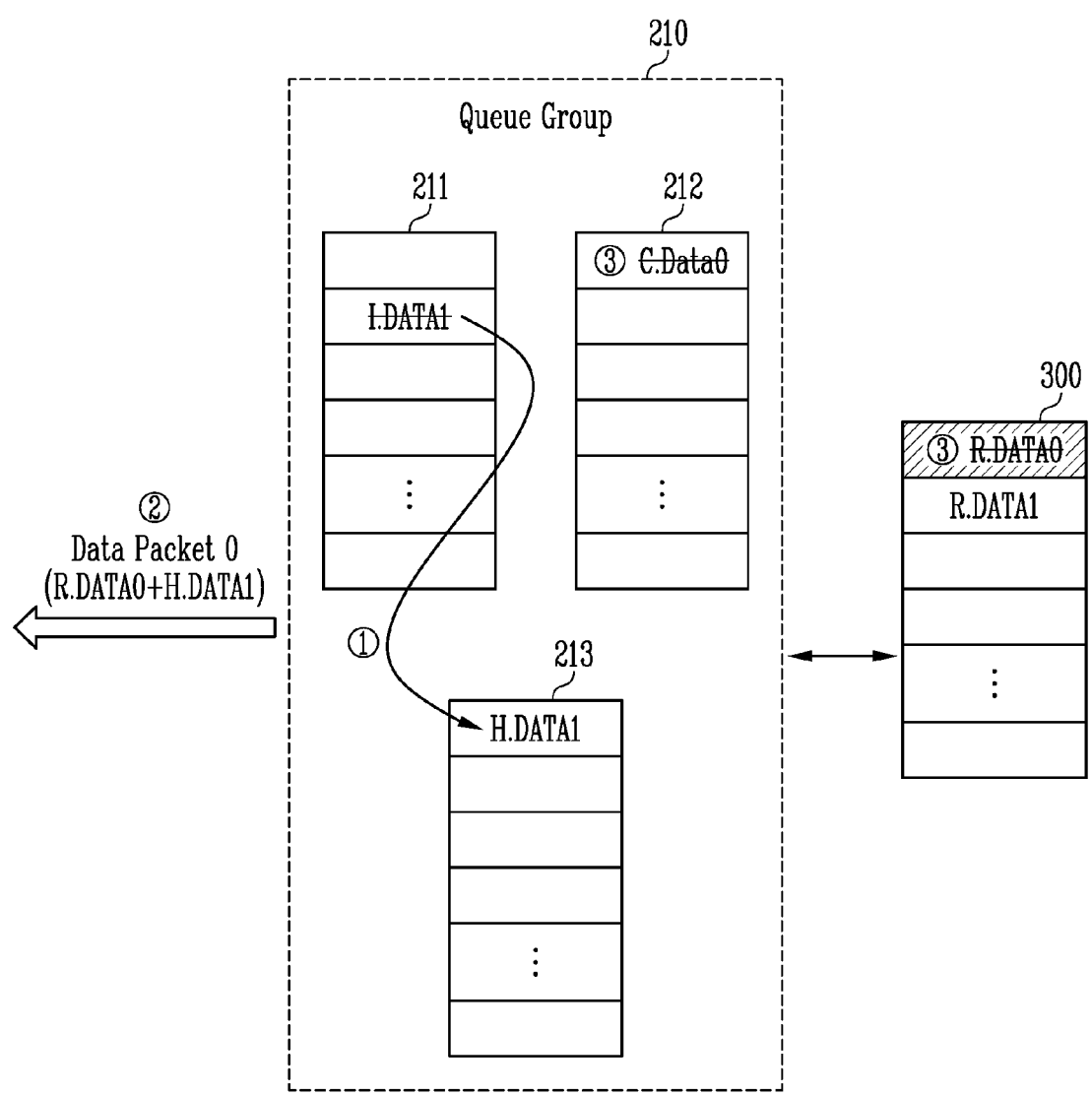

Referring to FIG. 9, as the hint header including the hint information on the read data R.DATA1 is generated, identification information H.DATA1 corresponding to the read data R.DATA1 may be stored in the hint queue 213. In an embodiment, the identification information H.DATA1 corresponding to the read data R.DATA1, which is stored in the hint queue 213, may be hint information itself included in the 20) hint header, but the present disclosure is not limited thereto. In addition, when the identification information H.DATA1 corresponding to the read data R.DATA1 is stored in the hint queue 213, the identification information I.DATA1 corresponding to the read data R.DATA1 stored in the initiation queue 211 may be deleted.

The data packet generator 220 may generate a data packet 0 including the read data R.DATA0, and the data packet 0 may be provided to the host 400. The data packet 0 may include the read data R.DATA0 itself determined as the first data, the basic header including the information on the read data R.DATA0, and the hint header including the hint information on the read data R.DATA1 determined as the second data.

As the read data R.DATA0 included in the data packet is provided to the host 400, the identification information C.DATA0 corresponding to the read data R.DATA0, which is stored in the completion queue 212, may be deleted. In an embodiment, after the read data R.DATA0 is provided to the host 400, the read data R.DATA0 stored in the buffer memory 300 may be deleted or invalidated.

Figure 10:
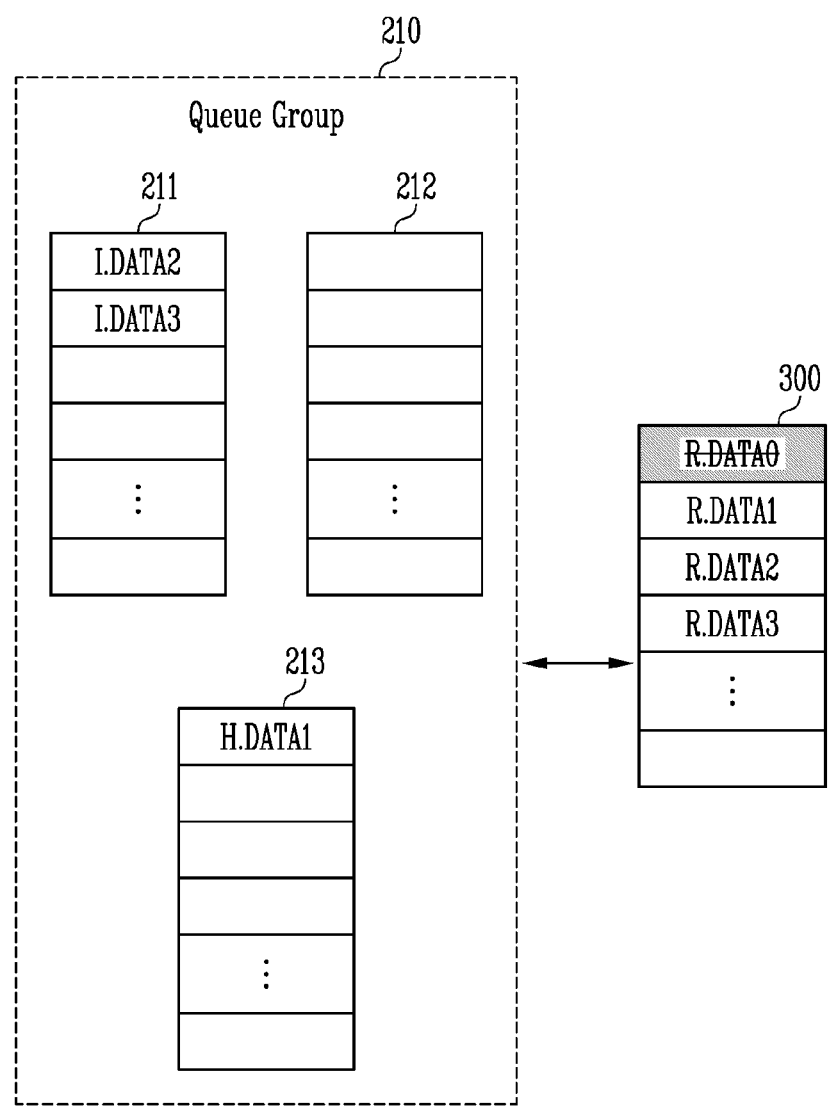

Referring to FIG. 10, storage of read data 2 and 3 R.DATA2 and R.DATA3 in the buffer memory 300 may be started, and accordingly, identification information I.DATA2 and I.DATA3 corresponding to the read data 2 (R.DATA2) and read data 3 (R.DATA3) may be stored in the initiation queue 211.

Figure 11:
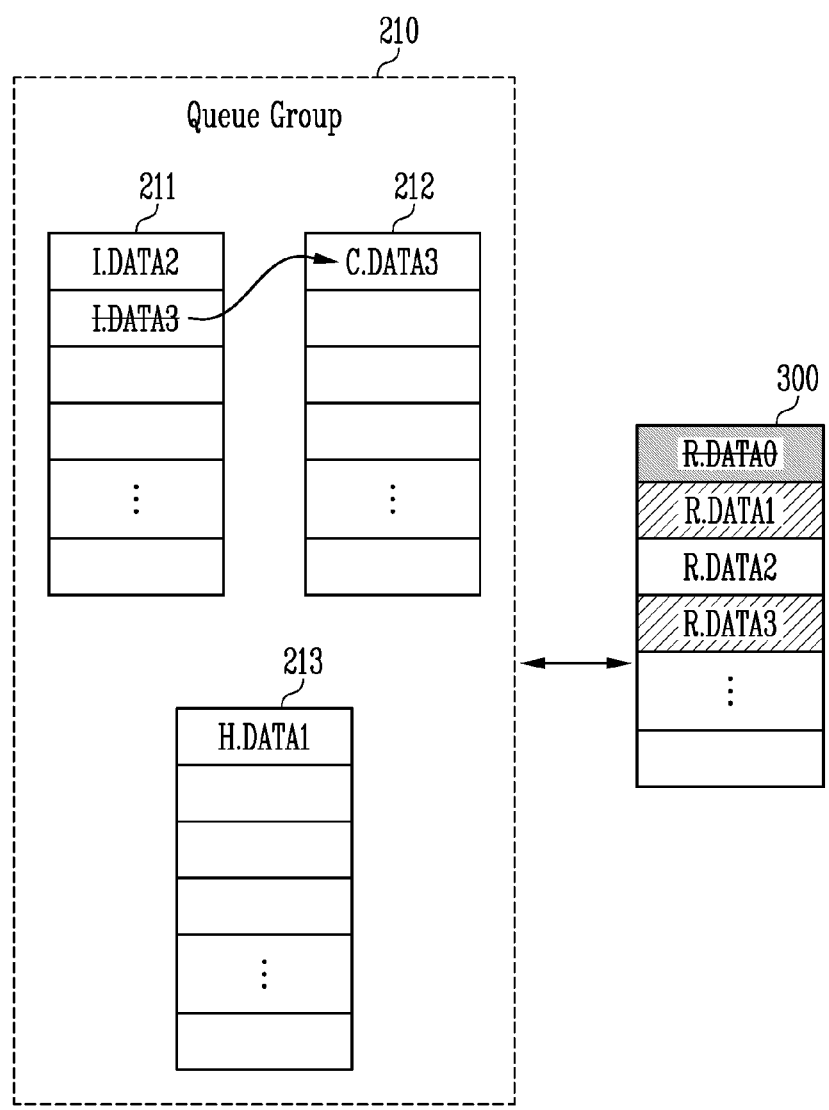

Referring to FIG. 11, storage of the read data R.DATA1 and R.DATA3 may be completed. Accordingly, identification information C. DATA3 corresponding to the read data R.DATA3 may be stored in the completion queue 212. When the identification information C.DATA3 corresponding to the read data R.DATA3 is stored in the completion queue 212, the identification information I.DATA3 corresponding to the read data R.DATA3, which is stored in the initiation queue 211, may be deleted. Meanwhile, any identification information corresponding to the read data R.DATA1 is not stored in the initialization queue 211, and the identification information H.DATA1 corresponding to the read data R.DATA1 is stored in the hint queue 213. Therefore, although the storage of the read data R.DATA1 in the buffer memory 300 is complete, any identification information corresponding to the read data R.DATA1 may not be stored in the completion queue 212.

Figure 12:
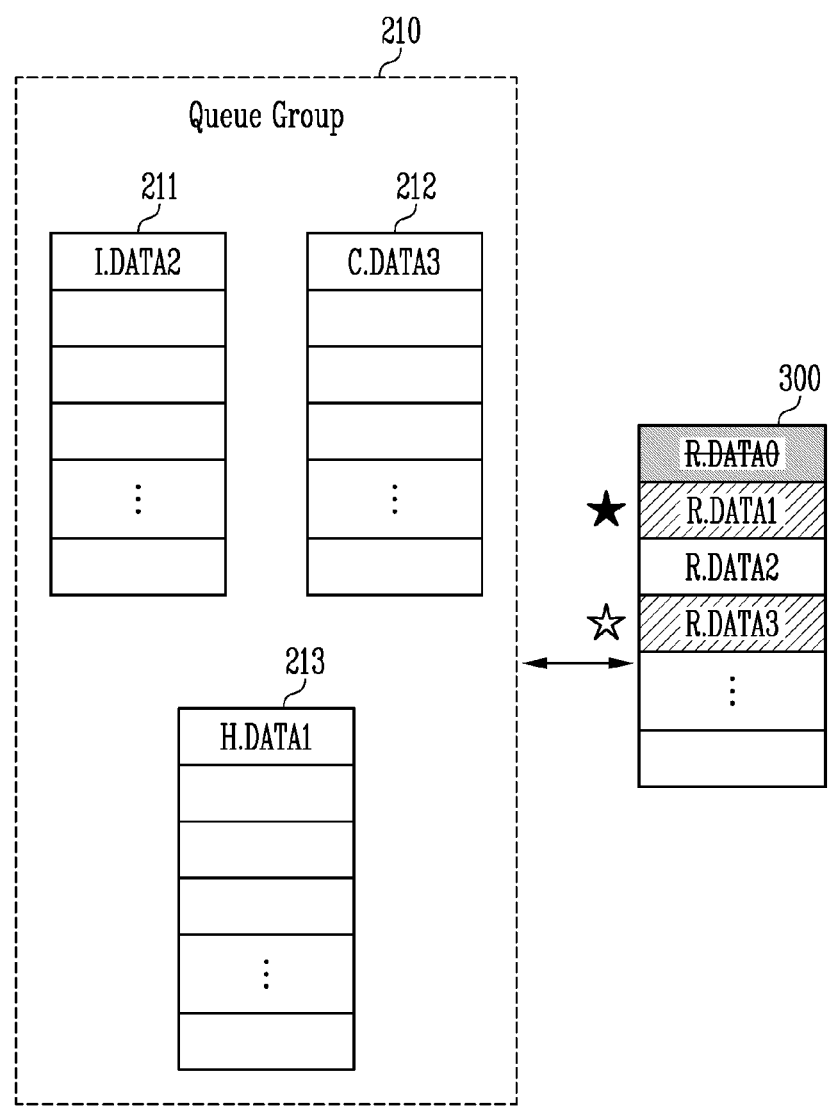

Referring to FIG. 12, in order to generate a data packet, first read data to be included in the data packet may be determined. First, the data packet generator 220 may select the first read data among read data corresponding to identification information stored in the hint queue 213. Since the identification information H.DATA1 corresponding to the read data R.DATA1 is currently stored in the hint queue 213, and the read data R.DATA1 is read data of which storage in the buffer memory 300 is complete, the read data R.DATA1 may be determined as the first read data. Accordingly, the data packet generator 220 may generate a basic header including information on the read data R.DATA1 determined as the first read data.

Also, the data packet generator 220 may determine second read data to generate a hint header included in the data packet. The second read data may be read data expected to be provided to the host 400 subsequently to the first read data. First, the data packet generator 220 may select the second read data among read data which are not the first read data, among read data corresponding to the identification information stored in the completion queue 212. Since the identification information C.DATA3 corresponding to the read data R.DATA3 is currently stored in the completion queue 212, and the read data R.DATA3 is read data which is not the first read data, the read data R.DATA3 may be determined as the second read data. Accordingly, the data packet generator 220 may generate a hint header including hint information on the read data R.DATA3 determined as the second read data.

Figure 13:
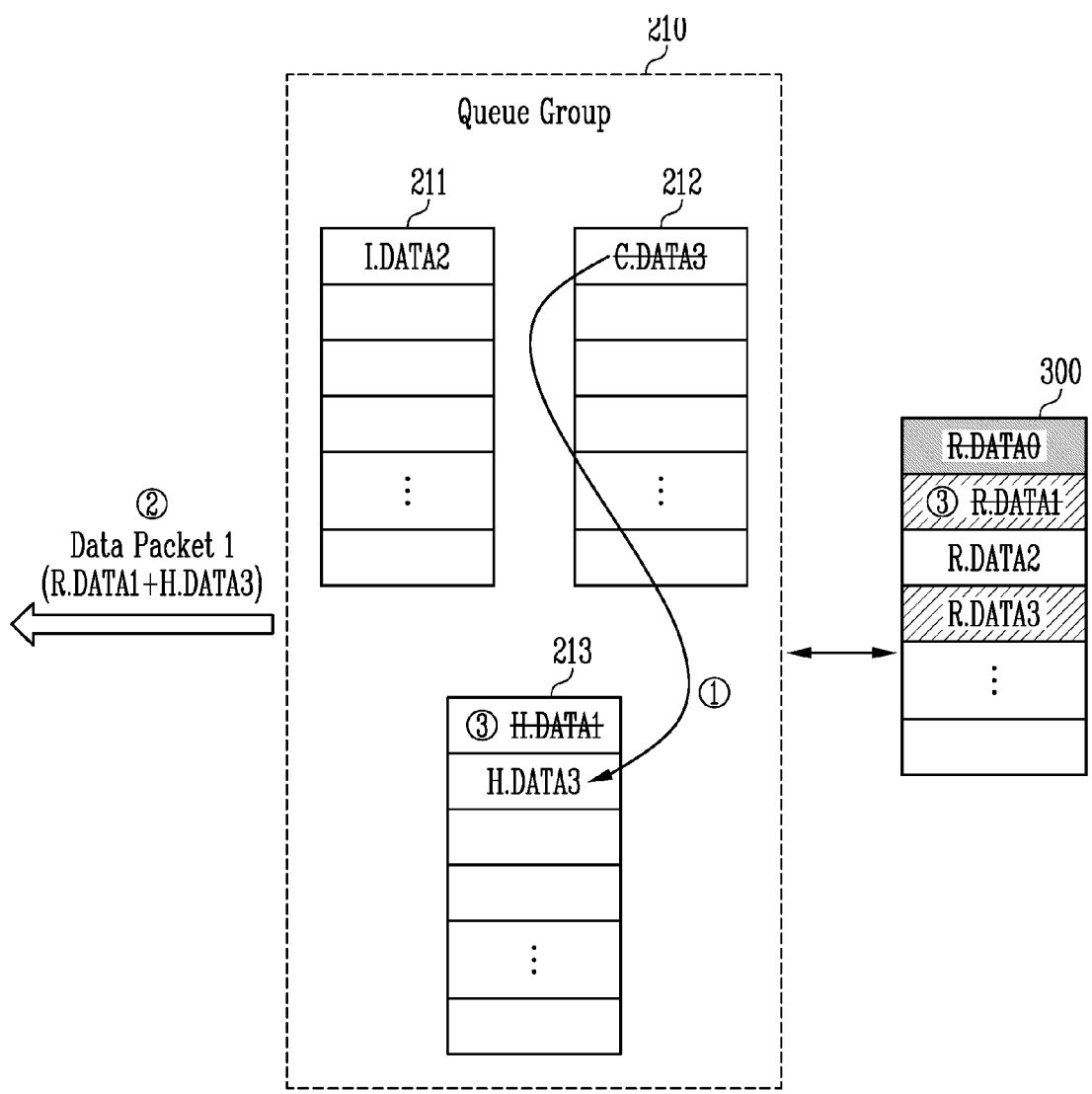

Referring to FIG. 13, as the hint header including the hint information on the read data R.DATA3 is generated, identification information H.DATA3 corresponding to the read data R.DATA3 may be stored in the hint queue 213. In an embodiment, the identification information H.DATA3 corresponding to the read data R.DATA3, which is stored in the hint queue 213, may be hint information itself included in the hint header, but the present disclosure is not limited thereto. In addition, when the identification information H.DATA3 corresponding to the read data R.DATA3 is stored in the hint queue 213, the identification information corresponding to the read data R.DATA3, which is stored in the completion queue 212, may be deleted.

The data packet generator 220 may generate a data packet 1 including the read data R.DATA1, and the data packet 1 may be provided to the host 400. The data packet 1 may include the read data R.DATA1 determined as the first data, the basic header including the information on the read data R.DATA1, and the hint header including the hint information on the read data R.DATA3 determined as the second data.

As the read data R.DATA1 included in the data packet is provided to the host 400, the identification information H.DATA1 corresponding to the read data R.DATA1, which is stored in the hint queue 213. In an embodiment, after the read data R.DATA1 is provided to the host 400, the read data R.DATA1 stored in the buffer memory 300 may be deleted or invalidated.

Figure 14:
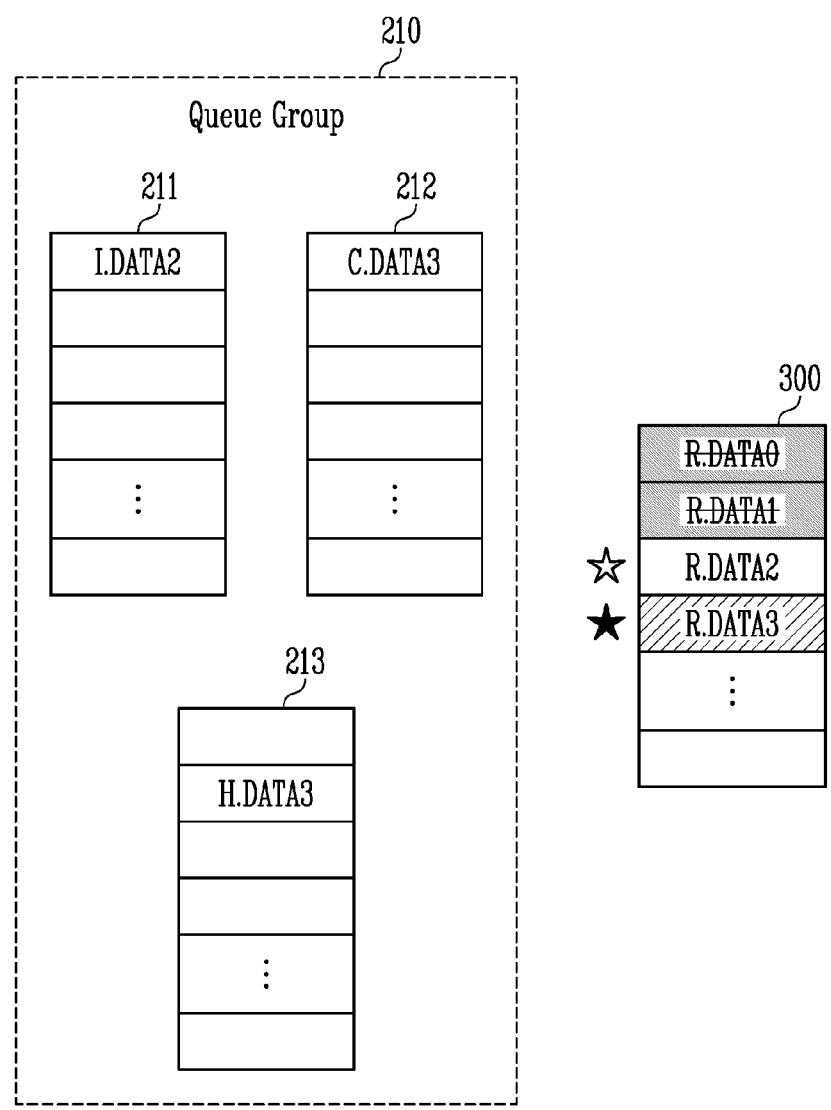

Referring to FIG. 14, in order to generate a data packet, first read data to be included in the data packet may be determined. First, the data packet generator 220 may select the first read data among read data corresponding to identification information stored in the hint queue 213. Since the identification information H.DATA3 corresponding to the read data R.DATA3 is currently stored in the hint queue 213, and the read data R.DATA3 is read data of which storage in the buffer memory 300 is complete, the read data R.DATA3 may be determined as the first read data. Accordingly, the data packet generator 220 may generate a basic header including information on the read data R.DATA3 determined as the first read data.

Also, the data packet generator 220 may determine second read data to generate a hint header included in the data packet. The second read data may be read data expected to be provided to the host 400 subsequently to the first read data. First, the data packet generator 220 may select the second read data among read data which are not the first read data, among the read data corresponding to the identification information stored in the completion queue 212. However, since there is no read data which is not the first read data among the read data corresponding to the identification information stored in the completion queue 212, next, the data packet generator 220 may select the second read data among read data corresponding to the identification information stored in the initiation queue 211. Therefore, the read data R.DATA2 may be determined as the second read data. Accordingly, the data packet generator 220 may generate a hint header including hint information on the read data R.DATA2 determined as the second read data.

Figure 15:
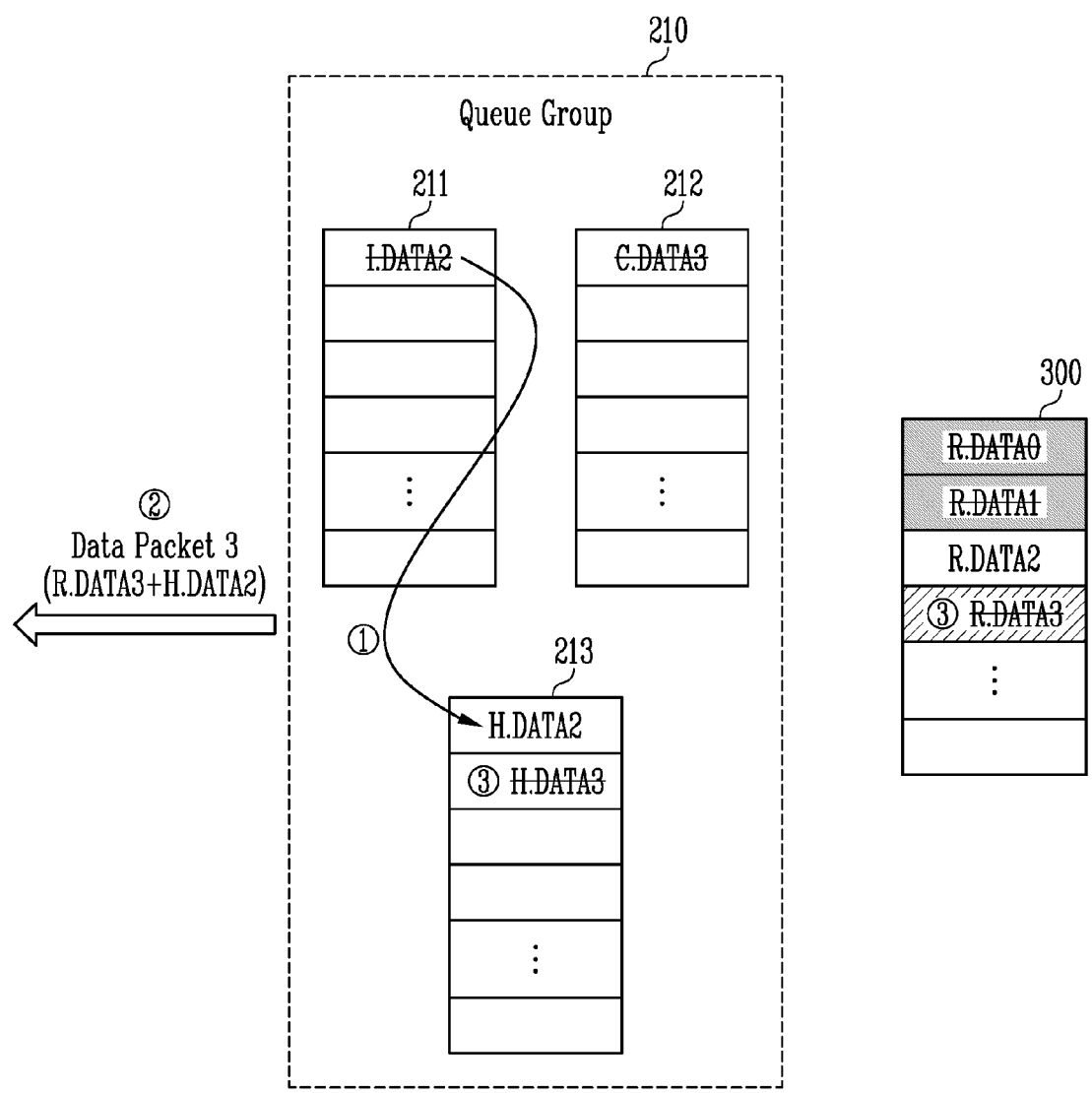

Referring to FIG. 15, as the hint header including the hint information on the read data R.DATA2 is generated, identification information H.DATA2 corresponding to the read data R.DATA2 may be stored in the hint queue 213. In an embodiment, the identification information H.DATA1 corresponding to the read data R.DATA1, which is stored in the hint queue 213, may be hint information itself included in the hint header, but the present disclosure is not limited thereto. In addition, when the identification information H.DATA2 corresponding to the read data R.DATA2 is stored in the hint queue 213, the identification information I.DATA2 corresponding to the read data R.DATA2 stored in the initiation queue 211 may be deleted.

The data packet generator 220 may generate a data packet 3 including the read data R.DATA3, and the data packet 3 may be provided to the host 400. The data packet 3 may include the read data R.DATA3 itself determined as the first data, the basic header including the information on the read data R.DATA3, and the hint header including the hint information on the read data R.DATA2 determined as the second data.

As the read data R.DATA3 included in the data packet is provided to the host 400, the identification information H.DATA3 corresponding to the read data R.DATA3, which is stored in the hint queue 213, may be deleted. In an embodiment, after the read data R.DATA3 is provided to the host 400, the read data R.DATA3 stored in the buffer memory 300 may be deleted or invalidated.

Figure 16:
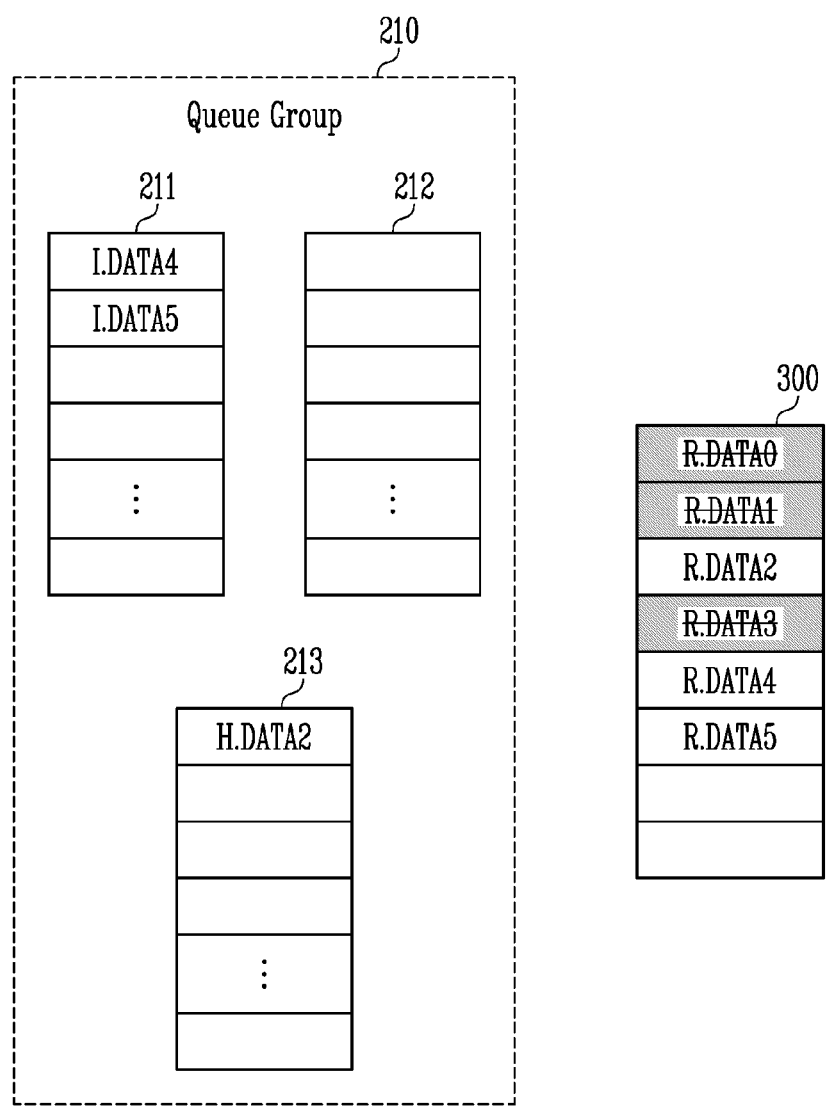

Referring to FIG. 16, storage of read data 4 (R.DATA4) and read data 5 (R.DATA5) in the buffer memory 300 may be started, and accordingly, identification information I.DATA4 and I.DATA5 corresponding to the read data R.DATA4 and R.DATA5 may be stored in the initiation queue 211.

Figure 17:
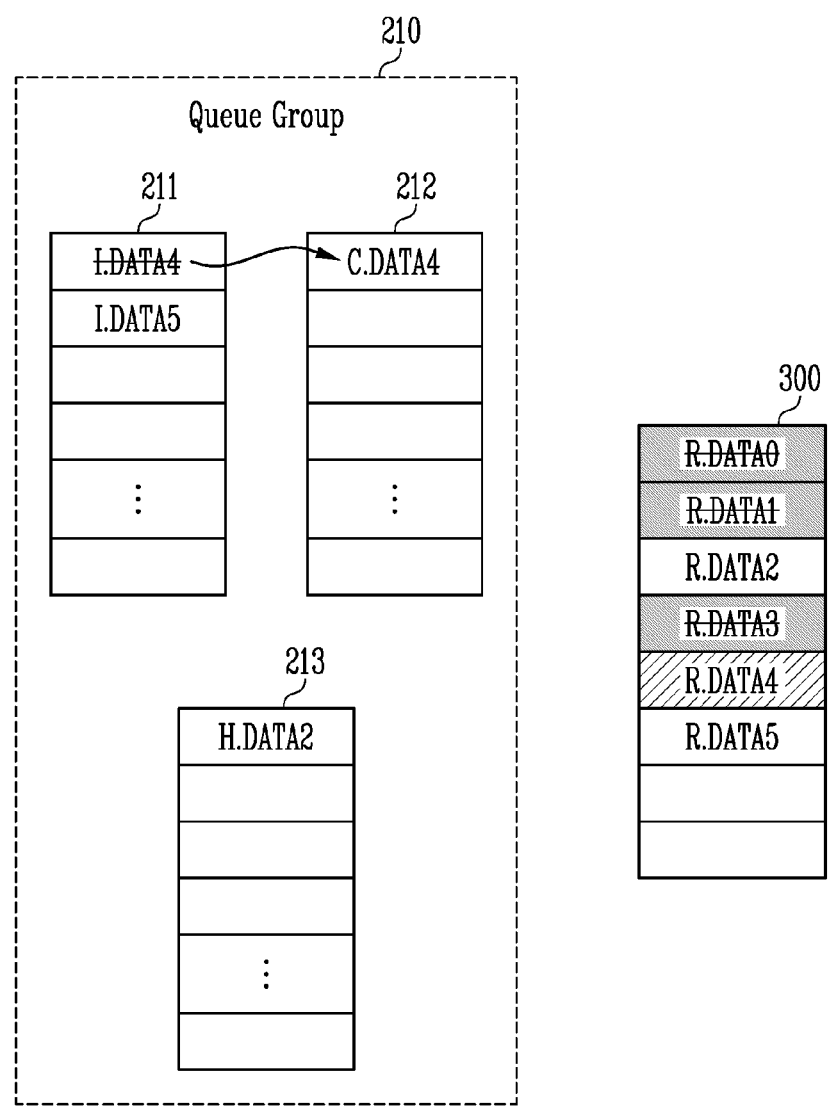

Referring to FIG. 17, storage of the read data R.DATA4 may be completed, and accordingly, identification information C.DATA4 corresponding to the read data R.DATA4 may be stored in the completion queue 212. When the identification information C.DATA4 corresponding to the read data R.DATA4 is stored in the completion queue 212, the identification information I.DATA4 corresponding to the read data 4 R.DATA4, which is stored in the initiation queue 211, may be deleted.

Figure 18:
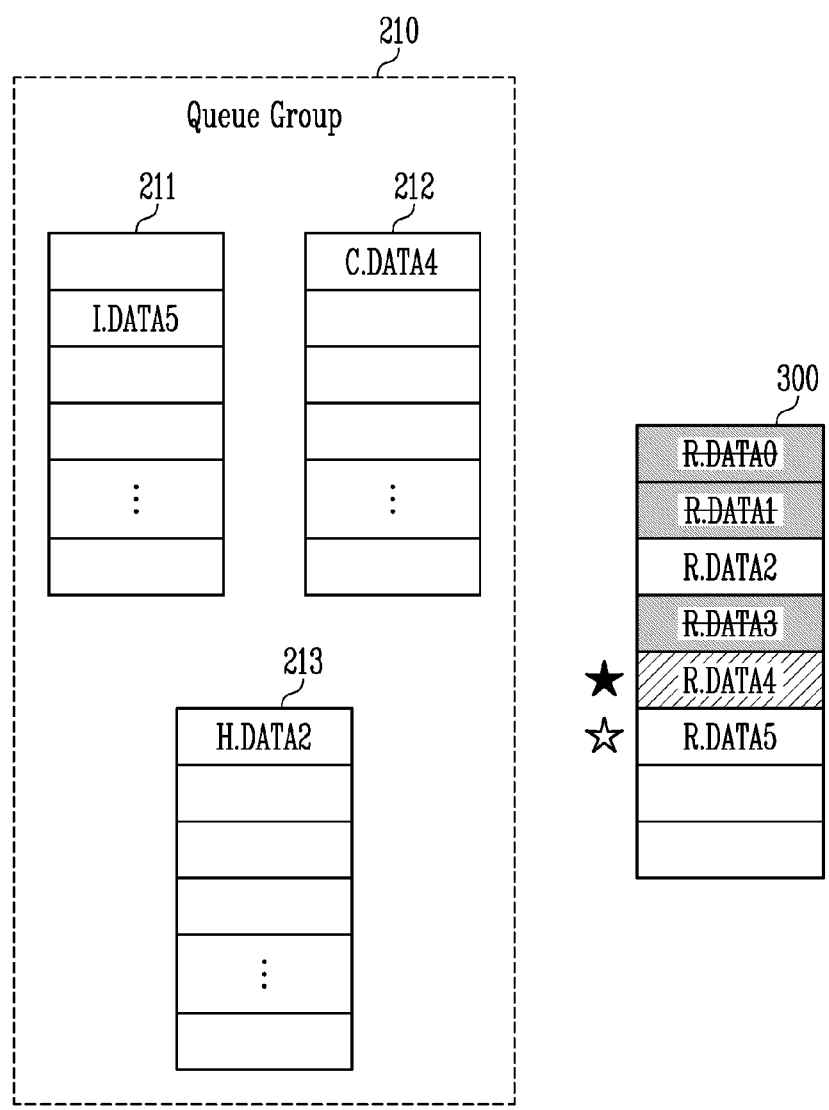

Referring to FIG. 18, in order to generate a data packet, first read data to be included in the data packet may be determined. First, the data packet generator 220 may select the first read data among read data corresponding to identification information stored in the hint queue 213. However, since any read data of which storage in the buffer memory 300 is complete does not exist among read data corresponding to the identification information currently stored in the hint queue 213, next, the data packet generator 220 may select the first read data among read data corresponding to the identification information stored in the completion queue 212. Therefore, the read data R.DATA4 may be determined as the first read data. Accordingly, the data packet generator 220 may generate a basic header including information on the read data R.DATA4 determined as the first read data.

Also, the data packet generator 220 may determine second read data to generate a hint header included in the data packet. The second read data may be read data expected to be provided to the host 400 subsequently to the first read data. First, the data packet generator 220 may select the second read data among read data which are not the first read data, among the read data corresponding to the identification information stored in the completion queue 212. However, since there is no read data which is not the first read data among the read data corresponding to the identification information stored in the completion queue 212, next, the data packet generator 220 may select the second read data among read data corresponding to the identification information stored in the initiation queue 211. Therefore, the read data R.DATA5 may be determined as the second read data. Accordingly, the data packet generator 220 may generate a hint header including hint information on the read data R.DATA5 determined as the second read data.

Figure 19:
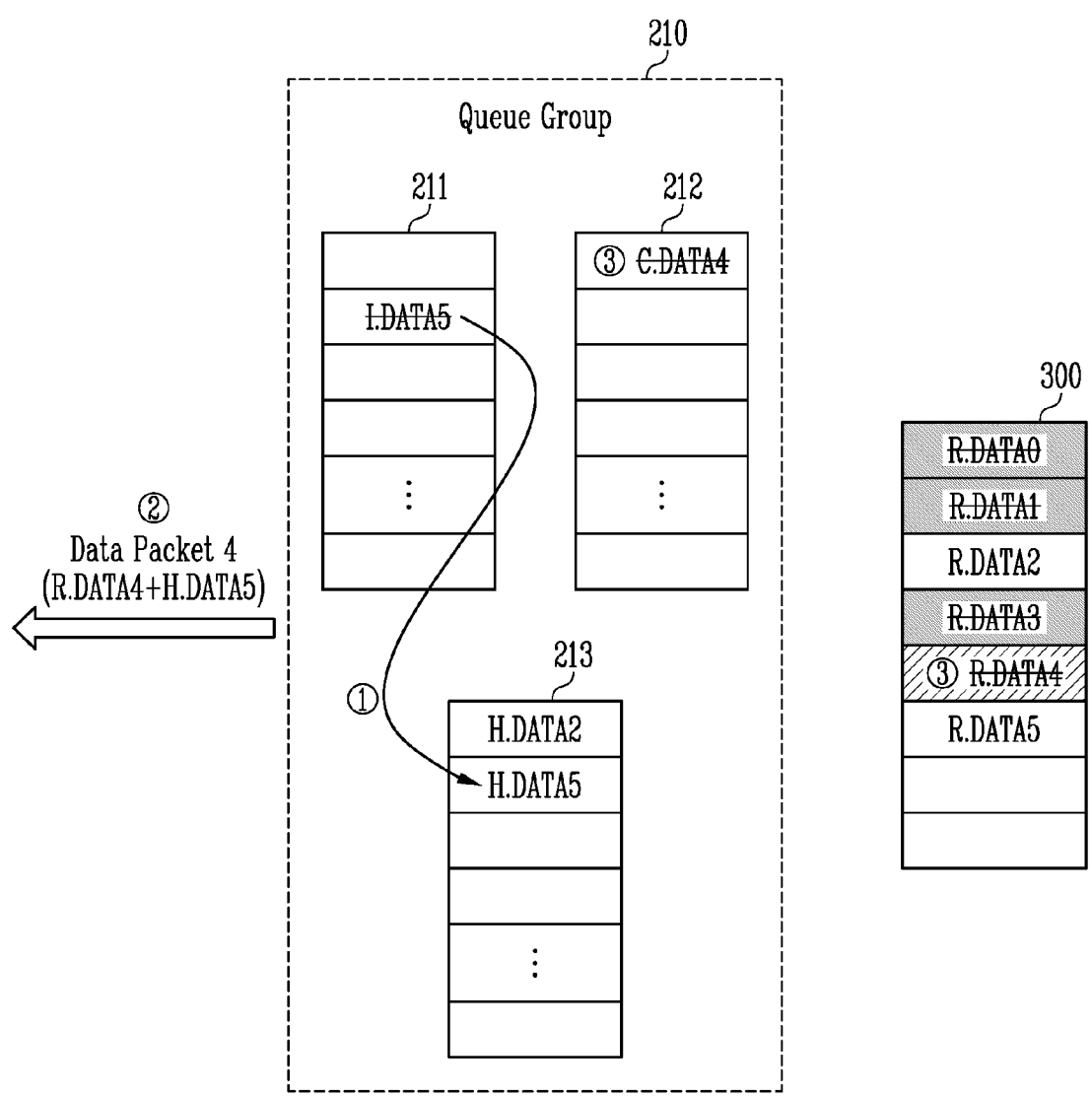

Referring to FIG. 19, as the hint header including the hint information on the read data R.DATA5 is generated, identification information H.DATA5 corresponding to the read data R.DATA5 may be stored in the hint queue 213. In an embodiment, the identification information H.DATA5 corresponding to the read data R.DATA5, which is stored in the hint queue 213, may be hint information itself included in the hint header, but the present disclosure is not limited thereto. In addition, when the identification information H.DATA5 corresponding to the read data R.DATA5 is stored in the hint queue 213, the identification information I.DATA5 corresponding to the read data R.DATA5 stored in the initiation queue 211 may be deleted.

The data packet generator 220 may generate a data packet 4 including the read data R.DATA4, and the data packet 4 may be provided to the host 400. The data packet 4 may include the read data R.DATA4 itself determined as the first data, the basic header including the information on the read data R.DATA4, and the hint header including the hint information on the read data R.DATA5 determined as the second data.

As the read data R.DATA4 included in the data packet is provided to the host 400, the identification information C.DATA4 corresponding to the read data R.DATA4, which is stored in the completion queue 212, may be deleted. In an embodiment, after the read data R.DATA4 is provided to the host 400, the read data R.DATA4 stored in the buffer memory 300 may be deleted or invalidated.

Figure 20:
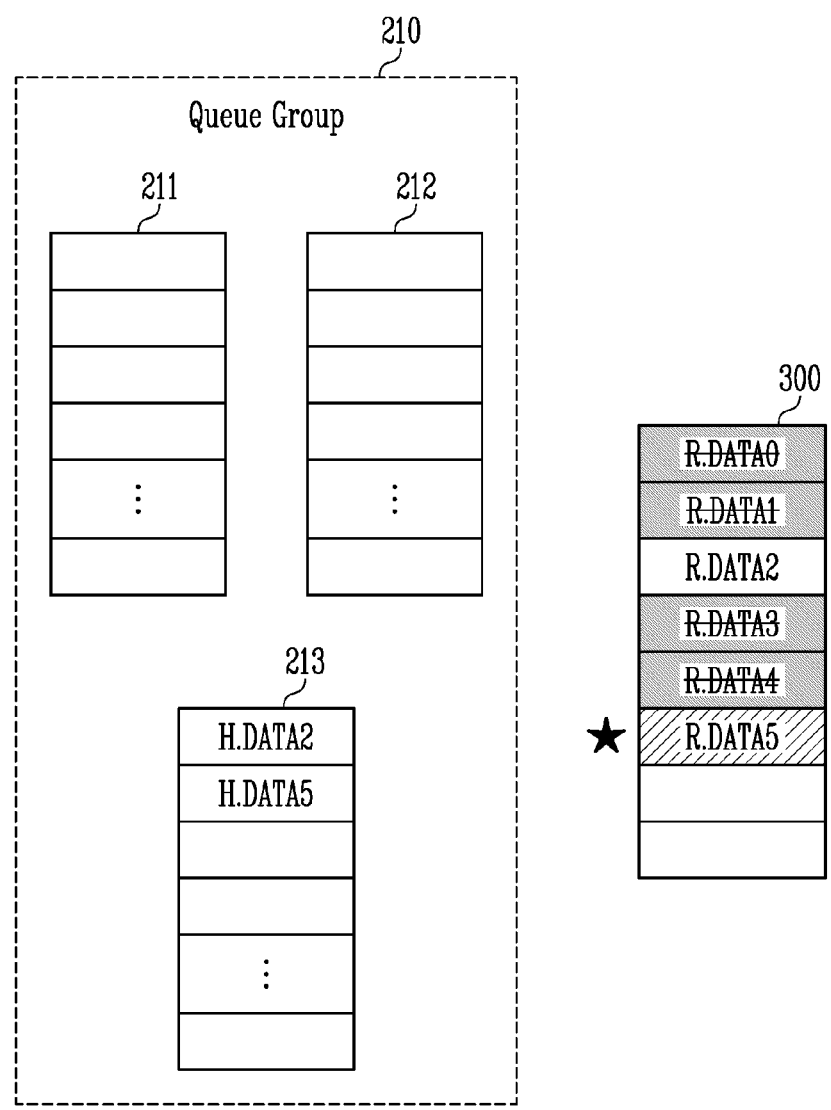

Referring to FIG. 20, storage of the read data R.DATA5 may be completed. Any identification information corresponding to the read data R.DATA5 is not stored in the initiation queue 211, and the identification information H.DATA5 corresponding to the read data R.DATA5 is stored in the hint queue 213. Therefore, the storage of the read data R.DATA5 in the buffer memory 300 is complete, any identification information corresponding to the read data R.DATA5 may not be stored in the completion queue 212.

In addition, in order to generate a data packet, first read data to be included in the data packet may be determined. First, the data packet generator 220 may select the first read data among read data corresponding to identification information stored in the hint queue 213. Since the identification information H.DATA2 corresponding to the read data R.DATA2 and the identification information H.DATA5 corresponding to the read data R.DATA5 are currently stored in the hint queue 213, and the read data R.DATA5 is read data of which storage in the buffer memory 300 is complete, the read data R.DATA5 may be determined as the first read data. Accordingly, the data packet generator 220 may generate a basic header including information on the read data R.DATA5 determined as the first read data.

Also, the data packet generator 220 may determine second read data to generate a hint header included in the data packet. The second read data may be read data expected to be provided to the host 400 subsequently to the first read data. First, the data packet generator 220 may select the second read data among read data which are not the first read data, among read data corresponding to the identification information stored in the completion queue 212. However, since there is no identification information currently stored in the completion queue 212, next, the data packet generator 220 may select the first read data among read data corresponding to the identification information stored in the initiation queue 211. However, since there is no identification information currently stored in the initiation queue 211, the second read data may not be determined. Accordingly, the data packet generator 220 may not generate any hint header.

Figure 21:
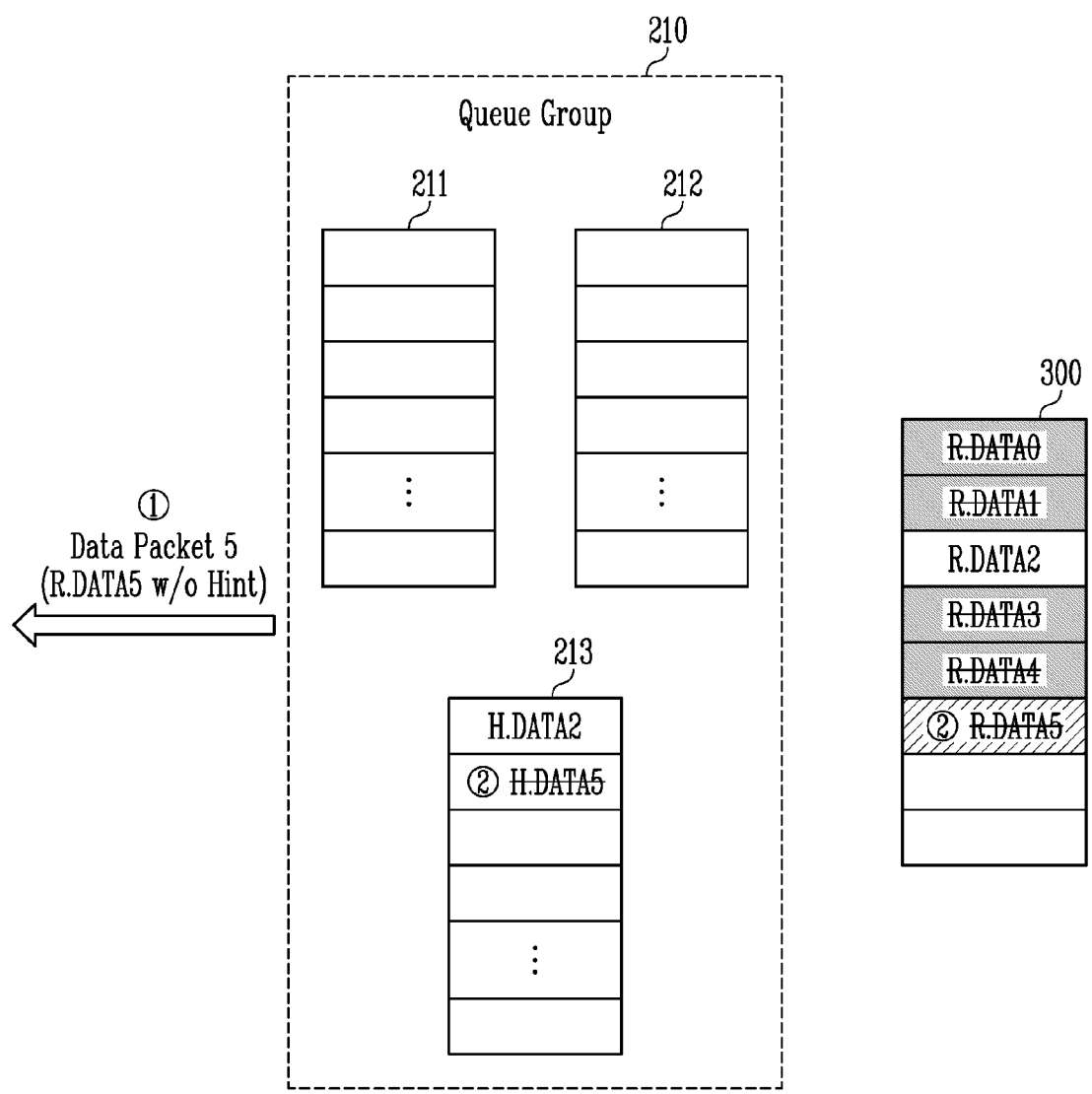

Referring to FIG. 21, the data packet generator 220 may generate a data packet 5 including the read data R.DATA5, and the data packet 5 may be provided to the host 400. The data packet 5 may include the read data R.DATA5 itself determined as the first data and the basic header including the information on the read data R.DATA5. In addition, since any hint header is not generated as the second read data is not determined, the data packet 5 may not include any hint header.

As the read data R.DATA5 included in the data packet is provided to the host 400, the identification information H.DATA5 corresponding to the read data R.DATA5, which is stored in the hint queue 213, may be deleted. In an embodiment, after the read data R.DATA5 is provided to the host 400, the read data R.DATA5 stored in the buffer memory 300 may be deleted or invalidated.

Figure 22:
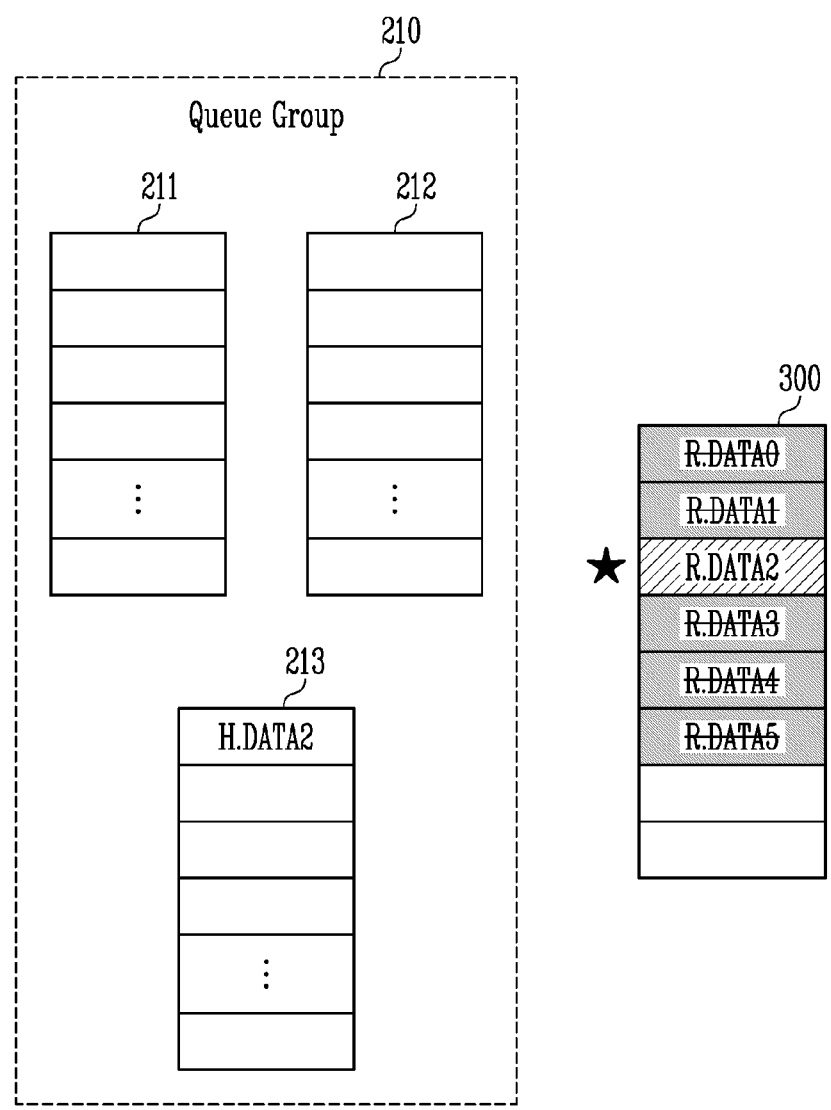

Referring to FIG. 22, storage of the read data R.DATA2 may be completed. Any identification information corresponding to the read data R.DATA2 is not stored in the initiation queue 211, and the identification information H.DATA2 corresponding to the read data R.DATA2 is stored in the hint queue 213. Therefore, the storage of the read data R.DATA2 in the buffer memory 300 is complete, any identification information corresponding to the read data R.DATA2 may not be stored in the completion queue 212.

In addition, in order to generate a data packet, first read data to be included in the data packet may be determined. First, the data packet generator 220 may select the first read data among read data corresponding to identification information stored in the hint queue 213. Since the identification information H.DATA2 corresponding to the read data R.DATA2 is currently stored in the hint queue 213, and the read data R.DATA2 is read data of which storage in the buffer memory 300 is complete, the read data R.DATA2 may be determined as the first read data. Accordingly, the data packet generator 220 may generate a basic header including information on the read data R.DATA2 determined as the first read data.

Also, the data packet generator 220 may determine second read data to generate a hint header included in the data packet. The second read data may be read data expected to be provided to the host 400 subsequently to the first read data. First, the data packet generator 220 may select the second read data among read data which are not the first read data, among read data corresponding to the identification information stored in the completion queue 212. However, since there is no identification information currently stored in the completion queue 212, next, the data packet generator 220 may select the first read data among read data corresponding to the identification information stored in the initiation queue 211. However, since there is also no identification information currently stored in the initiation queue 211, the second read data may not be determined. Accordingly, the data packet generator 220 may not generate any hint header.

Figure 23:
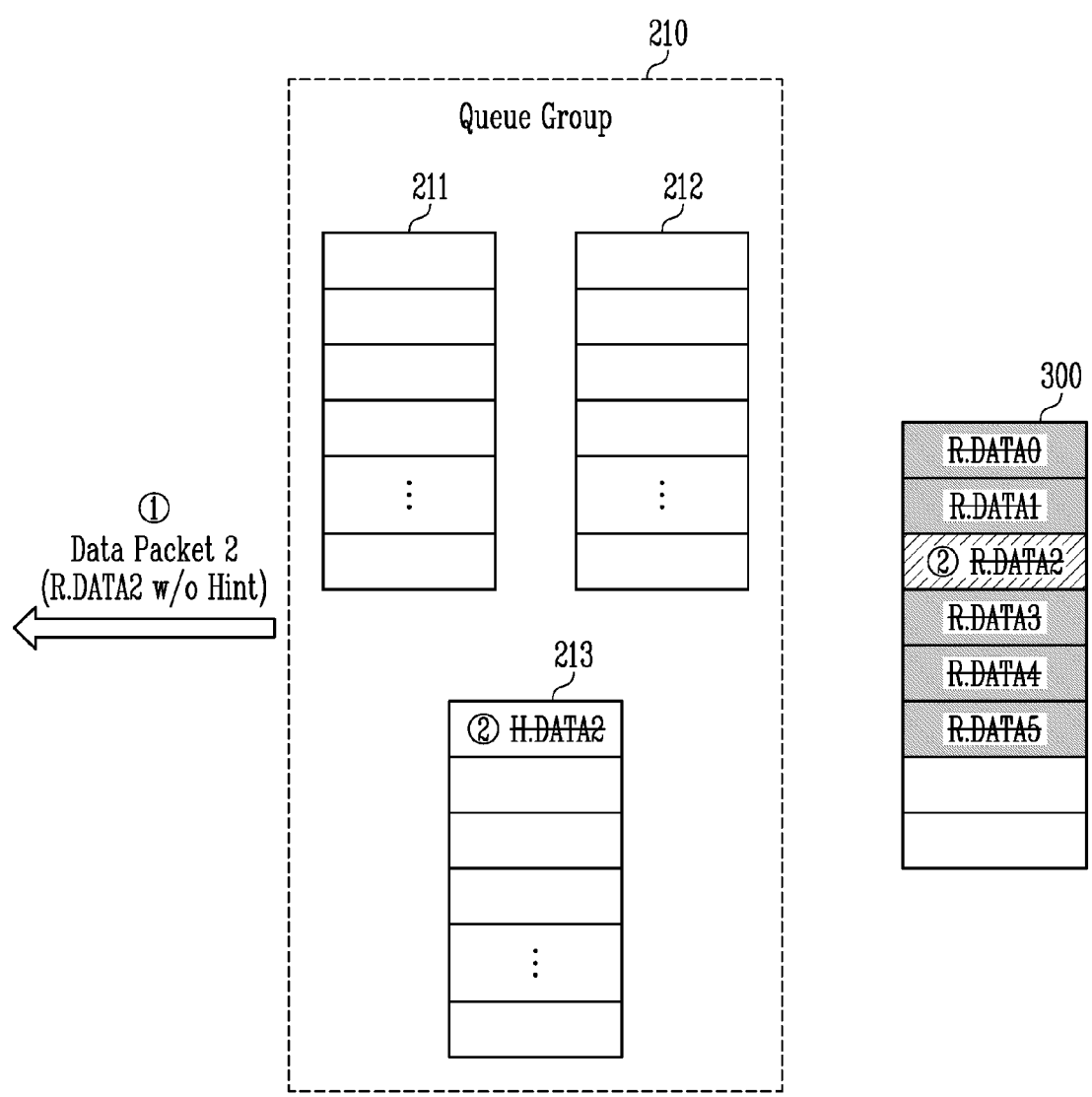

Referring to FIG. 23, the data packet generator 220 may generate a data packet 2 including the read data R.DATA2, and the data packet 2 may be provided to the host 400. The data packet 2 may include the read data R.DATA2 itself determined as the first data and the basic header including the information on the read dat R.DATA2. In addition, since any hint header is not generated as the second read data is not determined, the data packet 2 may not include any hint header.

As the read data 2R.DATA2 included in the data packet is provided to the host 400, the identification information H.DATA2 corresponding to the read data R.DATA2, which is stored in the hint queue 213, may be deleted. In an embodiment, after the read data R.DATA2 is provided to the host 400, the read data R.DATA2 stored in the buffer memory 300 may be deleted or invalidated.

FIG. 24 is a diagram illustrating a Ready To Transfer (RTT) Protocol Information Unit (PIU) as another example of the data packet generated in the memory system in accordance with an embodiment of the present disclosure.

Referring to FIGS. 1, 5, and 24, the memory controller 200 may receive a write request in the form of a command PIU from the host 400. The memory controller 200 may provide the host 400 with a Ready To Transfer (RTT) PIU informing that preparation to receive data has been completed, in response to the write request.

The RTT PIU may include a basic header 61 and a transaction specific field 62.

The basic header 61 may include information on read data, included in the data segment 64 of the data-in PIU. The basic header 61 of the data-in PIU may include a transaction type, flags, a logical unit number (LUN), a task tag, an initiator ID and an extended initiator ID, a total extra header length (total EHS length), a data segment length, and the like.

Each field included in the basic header 61 may be understood with reference to the descriptions shown in FIG. 5.

In an embodiment, since the PIU shown in FIG. 24 is an RTT PIU, the transaction type may be expressed as 11 0001b.

In an embodiment, since any extra header is not used for the RTT PIU, the total extra header length (Total EHS Length) may have a value of 0.

Since the RTT PIU does not include any data segment, the data segment length may have a value of 0.

The transaction specific field 62 may be a field defined according to an operation performed by the PIU. The transaction specific field 62 may include a hint header 65 including a data buffer offset, a data transfer count, and hint information.

Each field included in the transaction specific field 62 may be understood with reference to the descriptions shown in FIG. 5.

The data buffer offset may exhibit a start position of a data segment to be transferred in an initiator device. By using the data buffer offset, the memory controller 200 may non-sequentially receive data provided from the host 400.

The data transfer count may represent a number of bytes requested by a target device.

The hint header 65 included in the transaction specific field 62 may include a plurality of fields including hint information. That is, like the data-in PIU described in FIG. 5, the RTT PIU may also include hint headers. Each field included in the hint header 65 may be understood with reference to the descriptions shown in FIG. 5. The fields included in the hint header of the RTT PIU may include information on the RTT PIU, which is to be subsequently transferred.

Similarly to the descriptions in the process of generating the data-in PIU, the memory controller 200 may include one or more queues for storing identification information corresponding to data to be received. The memory controller 200 may predict a subsequent RTT PIU to be provided subsequently to a current RTT PIU, based on the identification information stored in the queues. Accordingly, the memory controller 200 may generate hint information on the subsequent RTT PIU to be subsequently provided.

Figure 25:
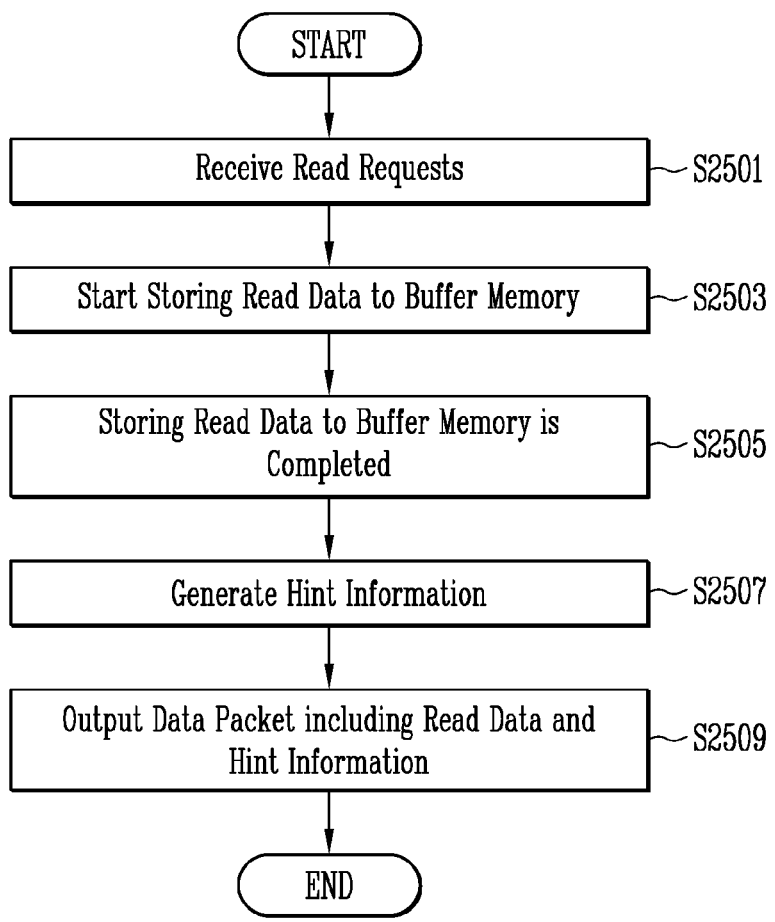
FIG. 25 is a flowchart illustrating an operating method of the memory system in accordance with an embodiment of the present disclosure.

FIG. 25 is a flowchart illustrating an operating method of the memory system in accordance with an embodiment of the present disclosure.

Referring to FIGS. 1 and 25, in operation S2501, the memory controller 200 may receive a read request from the host 400. The memory controller 200 may control the memory device 100 to read data from the memory device 100 in response to the read request. Accordingly, in operation S2503, storage of read data read from the memory device 100 in the buffer memory 300 may be started. In an embodiment, the one or more queues included in the memory controller 200 may store information on a storage progress state of the read data with respect to the buffer memory 300. In an embodiment, the memory controller 200 may include an initiation queue for storing identification information corresponding to the read data of which storage in the buffer memory 300 is started and a completion queue for storing identification information corresponding to the read data of which storage in the buffer memory 300 is complete.

In operation S2505, the storage of the read data in the buffer memory 300 may be completed. In operation S2507, the memory controller 200 may generate hint information by predicting read data to be subsequently provided, based on the information on the storage progress state of the read data with respect to the buffer memory 300. The memory controller 200 may further include a hint queue. Identification information corresponding to the read data in which the hint information is generated may be stored in the hint queue. In an embodiment, when the identification information corresponding to the read data in which the hint information is generated is stored, the identification information corresponding to the read data in which the hint information is generated may be deleted from the initiation queue or the completion queue.

In operation S2509, the memory system 50 may output a data packet including the read data and the hint information, to provide the data packet to the host 400. The data packet may include a basic header including information on the read data and a hint header including hint information on the read data to be subsequently provided.

Figure 26:
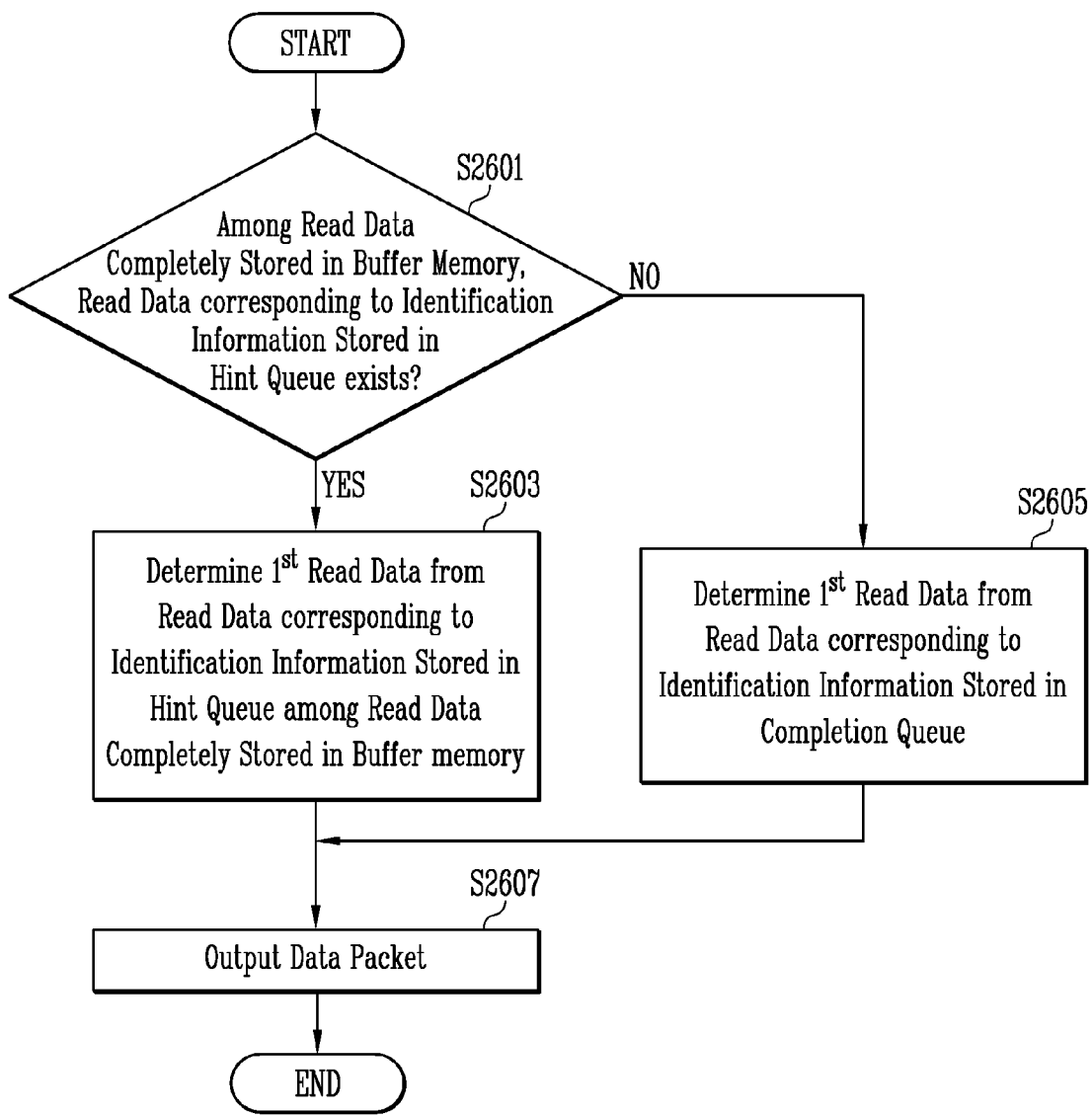
FIG. 26 is a flowchart illustrating a process of determining first read data included in a data packet in the operating method of the memory system in accordance with an embodiment of the present disclosure.

FIG. 26 is a flowchart illustrating a process of determining first read data included in a data packet in the operating method of the memory system in accordance with an embodiment of the present disclosure.

Referring to FIGS. 2 and 26, in S2601, the data packet generator 220 may check whether read data corresponding to identification information stored in the hint queue 213 exists among the read data of which storage in the buffer memory 300 is complete.

When read data corresponding to the identification information stored in the hint queue 213 exists among the read data of which storage in the buffer memory 300 is complete, in operation S2603, the data packet generator 220 may determine first read data among the corresponding data.

When any read data corresponding to the identification information stored in the hint queue 213 does not exist among the read data of which storage in the buffer memory 300 is complete, in operation S2605, the data packet generator 220 may determine the first read data among read data corresponding to identification information stored in the completion queue 212.

The data packet generator 220 may generate a data packet, based on the determined first read data. In operation S2607, the memory controller 200 may output the data packet, to provide the data packet to the host 400. The data packet may include a basic header including the first read data and information on the first read data. In an embodiment, the data packet may further include a hint header including hint information on second read data to be subsequently provided.

Figure 27:
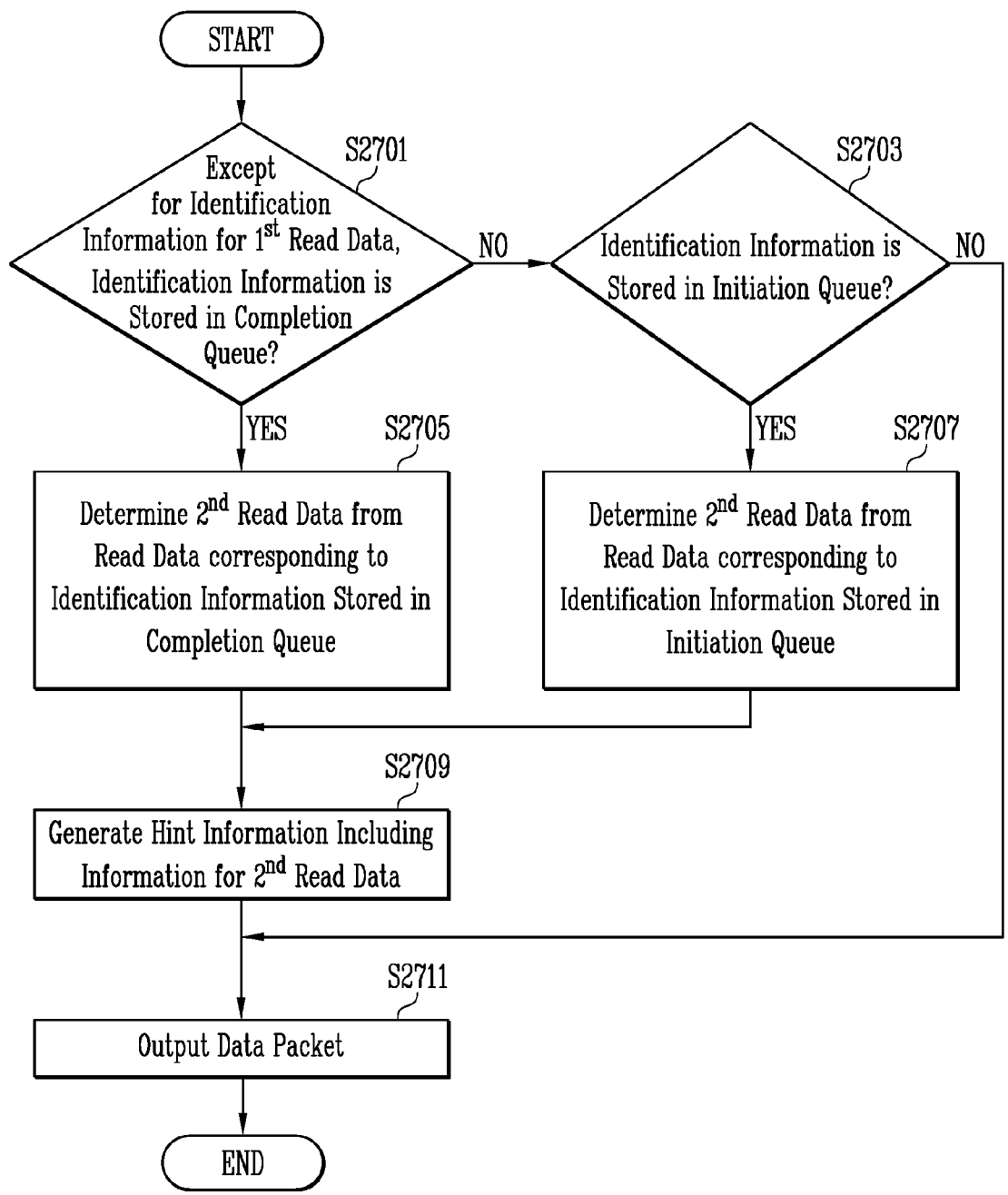
FIG. 27 is a flowchart illustrating a process of generating hint information included in a data packet in the operating method of the memory system in accordance with an embodiment of the present disclosure.

FIG. 27 is a flowchart illustrating a process of generating hint information included in a data packet in the operating method of the memory system in accordance with an embodiment of the present disclosure.

Referring to FIGS. 2 and 27, in operation S2701, the data packet generator 220 may check whether identification information stored in the completion queue 212 exists, besides identification information corresponding to first read data. When such identification information in the completion queue 212 exists, in operation S2702, the data packet generator 220 may determine second read data among read data corresponding to the identification information stored in the completion queue 212.

When such identification information stored in the completion queue 212 does not exist, in operation S2703, the data packet generator 220 may check whether identification information stored in the initiation queue 211 exists. When identification information stored in the initiation queue 211 exists, in operation S2707, the data packet generator 220 may determine the second read data among read data corresponding to the identification information stored in the initiation queue 211.

In operation S2709, the data packet generator 220 may generate hint information including information on the determined second read data. The data packet generator 220 may generate a data packet including the first read data and the hint information. More specifically, a data packet may be generated, which include the first read data, a basic header including information on the first read data, and a hint header including hint information on the second read data.

When it is checked that any identification information stored in the initiation queue 211 does not exist in the operation S2703, the data packet generator 220 may generate a data packet without any hint information. More specifically, a data packet may be generated, which does not include any separate hint information and includes the first read data and a basic header including information on the first read data.

In operation S2711, the memory controller 200 may output the data packet, to provide the data packet to the host 400.

Figure 28:
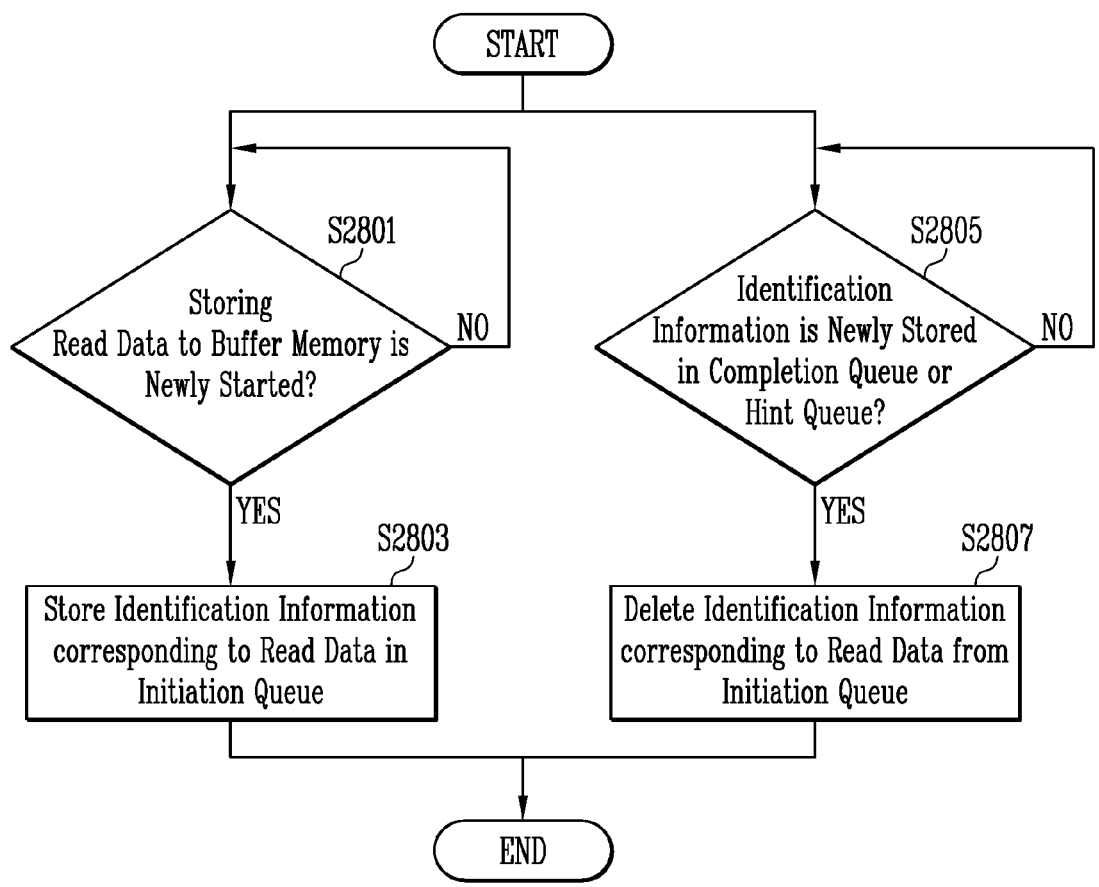
FIG. 28 is a flowchart illustrating an operation process of an initiation queue in the operating method of the memory system in accordance with an embodiment of the present disclosure.

FIG. 28 is a flowchart illustrating an operation process of the initiation queue in the operating method of the memory system in accordance with an embodiment of the present disclosure.

Referring to FIGS. 2 and 28, in operation S2801, the queue manager 230 may check whether storage of read data in the buffer memory 300 has been newly started. When it is checked that the storage of the read data in the buffer memory 300 has not been newly started, the queue manager 230 does not store new identification information in the initiation queue 211, but may wait until the storage of the read data in the buffer memory 300 is started. When it is checked that the storage of the read data in the buffer memory 300 has been newly started, in operation S2803, the queue manager 230 may store, in the initiation queue 211, identification information corresponding to the read data of which storage in the buffer memory 300 is started.

In operation S2805, the queue manager 230 may check whether identification information has been newly stored in the completion queue 212 or the hint queue 213. When it is checked that any identification information has not been newly stored in the completion queue 212 or the hint queue 213, the queue manager 230 does not change the identification information stored in the initiation queue 211, but may wait until identification information is newly stored in the completion queue 212 or the hint queue 213. When it is checked that identification information has been newly stored in the completion queue 212 or the hint queue 213, in operation S2807, the queue manager 230 may delete, from the initiation queue 211, identification information corresponding to read data of which identification information is newly stored in the completion queue 212 or the hint queue 213.

Figure 29:
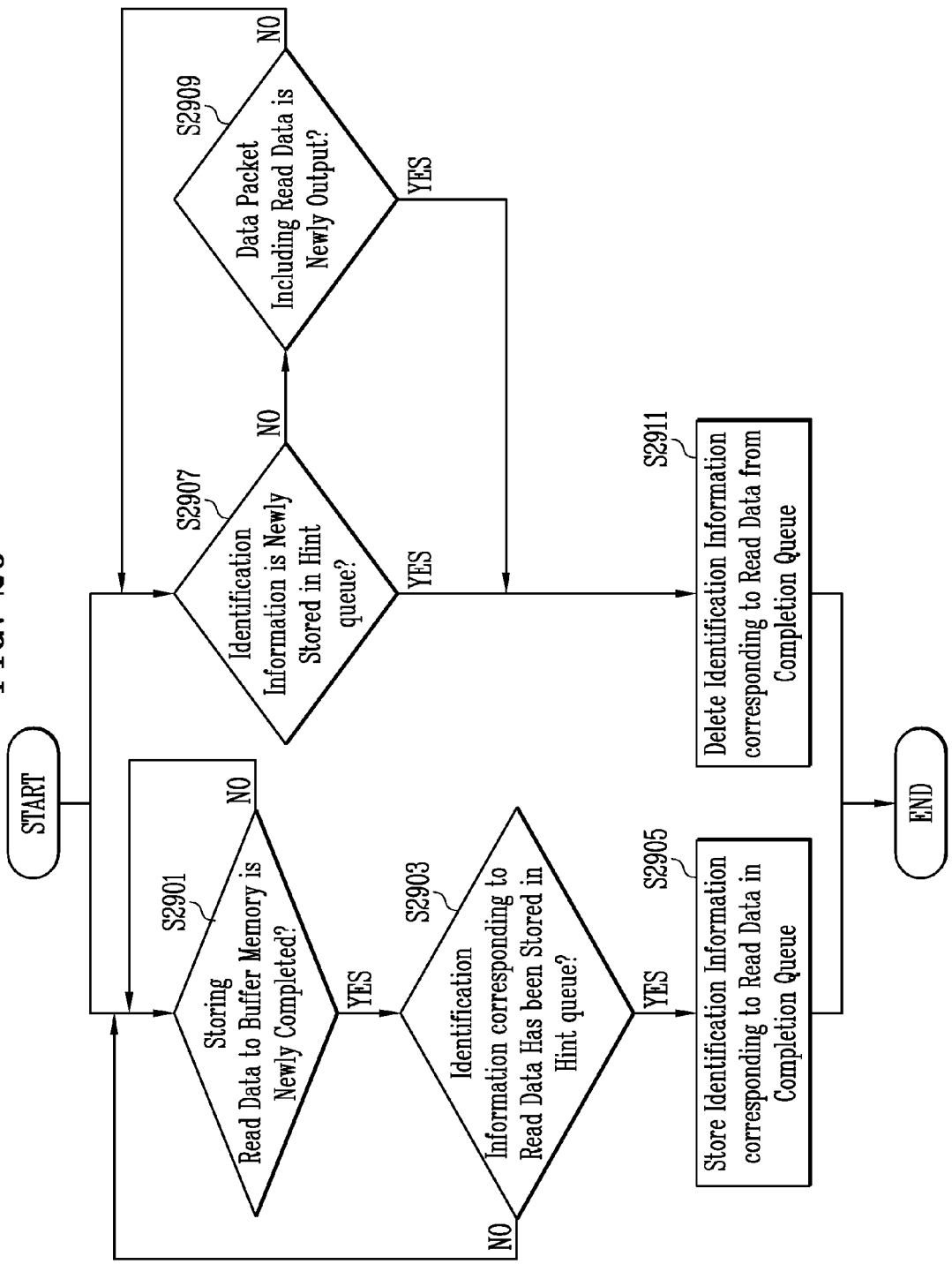
FIG. 29 is a flowchart illustrating an operation process of a completion queue in the operating method of the memory system in accordance with an embodiment of the present disclosure.

FIG. 29 is a flowchart illustrating an operation process of the completion queue in the operating method of the memory system in accordance with an embodiment of the present disclosure.

Referring to FIGS. 2 and 29, in operation S2901, the queue manager 230 may check whether storage of read data in the buffer memory 300 has been newly completed. When it is checked that the storage of the read data in the buffer memory 300 has not been newly completed, the queue manager 230 does not store any new identification information in the completion queue 212, but may wait until the storage of the read data in the buffer memory 300 is complete.

When it is checked that the storage of the read data in the buffer memory 300 has been newly completed, in operation S2903, the queue manager 230 may check whether identification information corresponding to the read data of which storage in the buffer memory 300 has been newly completed is stored in the hint queue 213. When it is checked that identification information corresponding to the read data of which storage in the buffer memory 300 has been newly completed is stored in the hint queue 213, the queue manager 230 does not store any new identification information in the completion queue 212, but may wait until storage of another read data in the buffer memory 300 is complete. When it is checked that no identification information corresponding to the read data of which storage in the buffer memory 300 has been newly completed is stored in the hint queue 213, in operation S2905, the queue manager 230 may store, in the completion queue 212, the identification information corresponding to the read data of which storage in the buffer memory 300 has been newly completed.

In operation S2907, the queue manager 230 may check whether identification information has been newly stored in the hint queue 213. When it is checked that identification information has been newly stored in the hint queue 213, in operation S2911, the queue manager 230 may delete, from the completion queue 212, identification information corresponding to the read data of which identification information is newly stored in the hint queue 213.

When it is checked that no identification information has been newly stored in the hint queue 213, in operation S2909, the queue manager 230 may check whether a data packet including read data has been newly output from the memory system 50. When it is checked that no data packet has been newly outputted, the queue manager 230 does not change the identification information stored in the completion queue 212, but May wait until identification information is newly stored in the hint queue 213 or until a data packet is newly outputted. When it is checked that a data packet has been newly outputted from the memory system 50, in the operation S2911, the queue manager 230 may delete identification information corresponding to the output read data from the completion queue 212.

Figure 30:
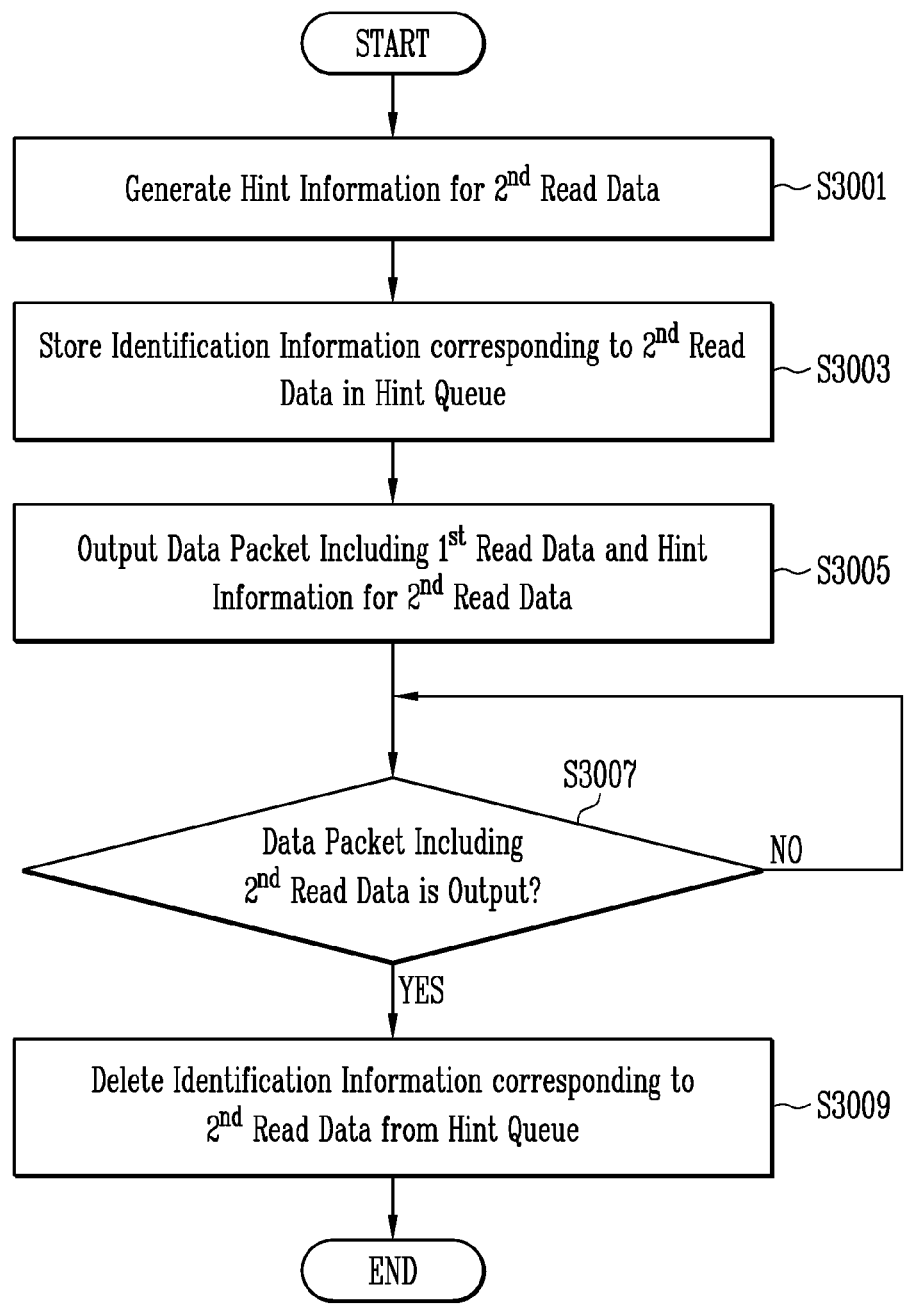
FIG. 30 is a flowchart illustrating an operation process of a hint queue in the operating method of the memory system in accordance with an embodiment of the present disclosure.

FIG. 30 is a flowchart illustrating an operation process of the hint queue in the operating method of the memory system in accordance with an embodiment of the present disclosure.

Referring to FIGS. 2 and 30, in operation S3001, the data packet generator 220 may determine second read data, based on identification information stored in the initiation queue 211 and the completion queue 212, and generate hint information on the second read data. In operation S3003, the queue manager 230 may store identification information corresponding to the second read data in the hint queue 213. In operation S3005, the memory system 50 may output a data packet including the hint information on the second read data and first read data.

In operation S3007, the queue manager 230 may check whether a data packet including the second read data has been output. When it is checked that no data packet including the second read data has been outputted, the queue manager 230 does not store the identification information on the second read data, which is stored in the hint queue 213, but may wait until a data packet including the second read data is output. When it is checked that a data packet including the second read data has been outputted, in operation S3009, the queue manager 230 may delete the identification information corresponding to the second read data from the hint queue 213.

Figure 31:
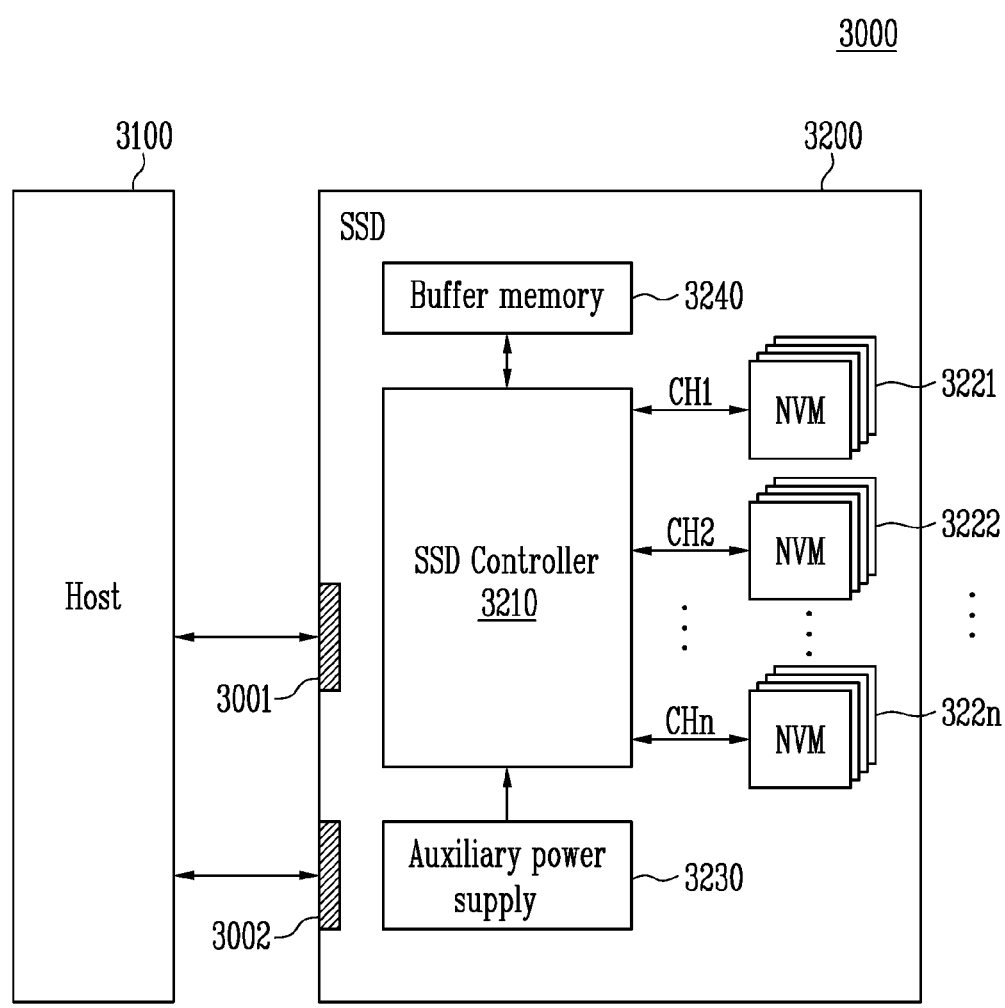
FIG. 31 is a block diagram illustrating a Solid State Drive (SSD) system to which the memory system is applied in accordance with an embodiment of the present disclosure.

FIG. 31 is a block diagram illustrating a Solid State Drive (SSD) system to which the memory system is applied in accordance with an embodiment of the present disclosure.

Referring to FIG. 31, the SSD system 3000 includes a host 3100 and an SSD 3200. The SSD 3200 exchanges a signal with the host 3100 through a signal connector 3001, and receives power through a power connector 3002. The SSD 3200 includes an SSD controller 3210, a plurality of flash memories 3221 to 322n, an auxiliary power supply 3230, and a buffer memory 3240.

In accordance with an embodiment of the present disclosure, the SSD controller 3210 may serve as the memory controller 200 or 1000 described with reference to FIGS. 1 to 3.

The SSD controller 3210 may control the plurality of flash memories 3221 to 322n in response to a signal received from the host 3100. The plurality of flash memories 3221 to 322n may be connected to the SSD controller 3210 through respective channels CH1 to CHn. Exemplarily, the signal may be a signal based on an interface between the host 3100 and the SSD 3200. For example, the signal which the SSD controller 3210 receives from the host 3100 may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

In an embodiment, the SSD controller 3210 may receive a read request from the host 3100, and provide read data to the host 3100 in response to the read request. The SSD controller 3210 may provide the read data in the form of a data packet, and the data packet may include read data and a basic header including information on the read data. In an embodiment, the data packet may include a hint header including hint information, and the hint information may mean information on read data to be provided subsequently to a currently provided data packet. The SSD controller 3210 may generate hint information by predicting read data to be subsequently provided, based on information on a preparation progress state of read data stored in the SSD 3200.

The auxiliary power supply 3230 is connected to the host 3100 through the power connector 3002. The auxiliary power supply 3230 may receive the power PWR input from the host 3100, and charge the power PWR. When the supply of power from the host 3100 is not smooth, the auxiliary power supply 3230 may provide power of the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store metadata (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In accordance with the present disclosure, there can be provided a memory controller, a memory system, and an operating method of a memory system, which can more efficiently generate hint information on data to be provided next.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller comprising:
    an initiation queue configured to store identification information corresponding to read data of which preparation for transfer to outside the memory controller has started in response to read requests received from the outside;
    a completion queue configured to store identification information corresponding to read data of which preparation for transfer to the outside is complete; and
    a data package generator configured to:
        generate hint information based on information stored in the initiation queue and the completion queue;
        generate a data packet including the hint information and first read data of which preparation for transfer is complete; and
        transfer the data packet to the outside,
    wherein the hint information includes information on second read data to be transferred to the outside subsequent to the first read data.

2. The memory controller of claim 1, wherein the data packet includes:
    a basic header including information on the first read data;
    a hint header including the hint information; and
    a data segment including the first read data.

3. The memory controller of claim 2, further comprising a hint queue configured to store identification information corresponding to the second read data included in the hint information.

4. The memory controller of claim 1, wherein the initiation queue is configured to delete identification information from the initiation queue when the corresponding identification information is stored in the completion queue.

5. The memory controller of claim 1, wherein the completion queue is configured to delete identification information from the completion queue for read data that has been provided in a corresponding data packet for transfer to the outside.

6. The memory controller of claim 3, wherein the initiation queue is configured to delete identification information from the initiation queue when the corresponding identification information is stored in the hint queue.

7. The memory controller of claim 3, wherein the completion queue is configured to delete identification information from the completion queue when the corresponding identification information is stored in the hint queue.

8. The memory controller of claim 3, wherein the hint queue is configured to delete identification information corresponding to read data that has been provided in a corresponding data packet for transfer to the outside.

9. The memory controller of claim 3, wherein the data packet generator determines the first read data from the identification information stored in the hint queue, among the read data of which preparation for transfer to the outside is complete.

10. The memory controller of claim 3, wherein, when the hint queue does not contain any identification information for read data being prepared for transfer, the data packet generator determines the first read data from the identification information stored in the completion queue.

11. The memory controller of claim 10, wherein the data packet generator determines the second read data among read data which are not the first read data from the identification information stored in the completion queue, generates hint information including the information on the second read data, and stores identification information corresponding to the second read data in the hint queue.

12. The memory controller of claim 10, wherein, when the completion queue does not contain any identification information for read data which is not the first read data, the data packet generator determines the second read data from the identification information stored in the initiation queue, generates hint information including the information on the second read data, and stores identification information corresponding to the second read data in the hint queue.

13. A memory system comprising:
a memory device;
a memory controller configured to provide a data packet including read data to outside the memory system in response to read requests received from the outside;
a buffer memory configured to store the read data read from the memory device; and
a queue group including one or more queues configured to store information representing a transfer state of the read data from the memory device to the buffer memory,
wherein the data packet includes:
a basic header including information on first read data;
a hint header including information on second read data to be provided subsequent to the first read data; and
a data segment including the first read data.

14. The memory system of claim 13, wherein the queue group includes:
an initiation queue configured to store identification information corresponding to read data of which storage in the buffer memory has started; and
a completion queue configured to store identification information corresponding to read data of which storage in the buffer memory is complete.

15. The memory system of claim 14, wherein the memory controller generates the hint header, based on the identification information stored in the initiation queue and the completion queue.

16. The memory system of claim 15, wherein the queue group further includes a hint queue configured to store identification information corresponding to the second read data.

17. The memory system of claim 16, wherein the memory controller generates the data packet, based on the identification information stored in the initiation queue, the completion queue, and the hint queue.

18. A method of operating a memory system, the method comprising:
starting storage of first read data and second read data in a buffer memory from a memory device in response to read requests received from outside the memory system;
storing, in an initiation queue, identification information corresponding to the first read data and the second read data;
generating hint information including information on the second read data, based on identification information stored in the initiation queue and a completion queue, when storage of the first read data in the buffer memory is complete; and
outputting a data packet including the first read data and the hint information,
wherein the completion queue is configured to store identification information corresponding to read data of which storage in the buffer memory is complete.

19. The method of claim 18, further comprising storing identification information corresponding to the second read data in a hint queue.

20. The method of claim 19, further comprising:
after storing the identification information corresponding to the second read data in the hint queue,
deleting the identification information corresponding to the second read data stored in the initiation queue or the completion queue.

* * * * *